US012406496B2

(12) United States Patent
Girdhar et al.

(10) Patent No.: US 12,406,496 B2
(45) Date of Patent: Sep. 2, 2025

(54) ANTICIPATIVE VIDEO TRANSFORMER MODEL FOR FUTURE ACTION ANTICIPATION

(71) Applicant: Meta Platforms, Inc., Menlo Park, CA (US)

(72) Inventors: Rohit Girdhar, Jersey City, NJ (US); Kristen Lorraine Grauman, Austin, TX (US)

(*) Notice: Subject to any disclaimer, the term of this patent is extended or adjusted under 35 U.S.C. 154(b) by 582 days.

(21) Appl. No.: 17/824,402

(22) Filed: May 25, 2022

(65) Prior Publication Data

US 2023/0386203 A1 Nov. 30, 2023

(51) Int. Cl.
*G06V 20/40* (2022.01)
*G06V 10/62* (2022.01)
*G06V 10/776* (2022.01)
*G06V 10/82* (2022.01)
*G06V 20/10* (2022.01)

(52) U.S. Cl.
CPC .......... *G06V 20/41* (2022.01); *G06V 10/62* (2022.01); *G06V 10/776* (2022.01); *G06V 10/82* (2022.01); *G06V 20/10* (2022.01); *G06V 20/46* (2022.01)

(58) Field of Classification Search
None
See application file for complete search history.

(56) References Cited

U.S. PATENT DOCUMENTS

2020/0160064 A1* 5/2020 Wang .................. G06V 10/82
2023/0351759 A1* 11/2023 Girase ................. G06V 20/49

OTHER PUBLICATIONS

Girdhar R., et al., "Anticipative Video Transformer," 2021 IEEE/CVF International Conference on Computer Vision (ICCV), Oct. 10, 2021, pp. 13485-13495. (Year: 2021).*
Zhao S., et al., "Point transformer," 2021, In ICCV, 11 pages.
International Preliminary Report on Patentability for International Application No. PCT/US2023/023490, mailed Dec. 5, 2024, 6 pages.
Girdhar R., et al., "Anticipative Video Transformer," 2021 IEEE/CVF International Conference on Computer Vision (ICCV), Oct. 10, 2021, pp. 13485-13495.
Lample G., et al., "Cross-Lingual Language Model Pretraining," Neural Information Processing Systems 32 (NeurIPS), 2019, pp. 1-11.

(Continued)

*Primary Examiner* — Andrew H Lam
(74) *Attorney, Agent, or Firm* — Seyfarth Shaw LLP

(57) ABSTRACT

In particular embodiments, a computing system may receive a video comprising a plurality of image frames. The system may generate, for each image frame in the plurality of image frames and using a spatial-attention encoder, an image-frame feature corresponding to the image frame. For each image-frame feature, the system may generate, using a temporal-attention decoder, a predicted future feature based on one or more of the image-frame features corresponding to one or more of the plurality of image frames that precede a time associated with the predicted future feature. The system may generate a future action anticipation based on the predicted future feature. The future action anticipation corresponds to an anticipation of a future action occurring after a sequence of actions observed in the plurality of images frames in the video.

20 Claims, 12 Drawing Sheets
(7 of 12 Drawing Sheet(s) Filed in Color)

(56) References Cited

OTHER PUBLICATIONS

Lewis M., et al., "BART: Denoising Sequence-to-Sequence Pre-training for Natural Language Generation, Translation, and Comprehension," arXiv preprint arXiv:1910.13461, 2019, 10 pages.
Li X., et al., "Directional Temporal Modeling for Action Recognition," European Conference on Computer Vision (ECCV), 2020, 17 pages.
Li Y., et al., "In the Eye of Beholder: Joint Learning of Gaze and Actions in First Person Video", The European Conference on Computer Vision (ECCV), 2018, pp. 619-635.
Liu D., et al., "Non-Local Recurrent Network for Image Restoration," Advances in Neural Information Processing Systems (NeurIPS), 2019, 10 pages.
Liu M., et al., "Forecasting Human Object Interaction: Joint Prediction of Motor Attention and Actions in First Person Video," European Conference on Computer Vision (ECCV), 2020, pp. 704-721.
Liu W., et al., "Future Frame Prediction for Anomaly Detection—A New Baseline," Computer Vision and Pattern Recognition (CVPR), 2018, pp. 6536-6545.
Long X., et al., "Attention Clusters: Purely Attention based Local Feature Integration for Video Classification," Computer Vision and Pattern Recognition (CVPR), 2018, pp. 7834-7843.
Luc P., et al., "Predicting Future Instance Segmentation by Forecasting Convolutional Features," European Conference on Computer Vision (ECCV), 2018, 16 pages.
Ma S., et al., "Learning Activity Progression in LSTMs for Activity Detection and Early Detection," Computer Vision and Pattern Recognition (CVPR), 2016, pp. 1942-1950.
Miech A., et al., "Learnable Pooling with Context Gating for Video Classification," arXiv:1706.06905v2 [cs.CV], Mar. 5, 2018, 8 pages.
Miech A., et al., "Leveraging the Present to Anticipate the Future in Videos," IEEE/CVF Conference on Computer Vision and Pattern Recognition (CVPR) Workshops, 2019, 8 pages.
Nagarajan T., et al., "Ego-Topo: Environment Affordances from Egocentric Video," The IEEE/CVF Conference on Computer Vision and Pattern Recognition (CVPR), 2020, pp. 163-172.
Neimark D., et al., "Video Transformer Network," IEEE/CVF International Conference on Computer Vision (ICCV) Workshops, 2021, pp. 3163-3172.
Oord A., et al., "Representation Learning with Contrastive Predictive Coding," Machine Learning, 2018, pp. 1-13.
Peters M.E., et al., "Deep Contextualized Word Representations," In Proceedings of ACL, Jun. 1-6, 2018, pp. 2227-2237.
Piaget J., "La naissance de l'intelligence chez l'enfant. [The Origins of Intelligence in Children]," 1935, 442 pages. (English Translation).
Radford A., et al., "Language Models are Unsupervised Multitask Learners," 2019, 24 pages.
Radford A., et al., "Improving Language Understanding by Generative Pre-Training," 2018, 12 pages.
Raffel C., et al., "Exploring the Limits of Transfer Learning with a Unified Text-to-Text Transformer," arXiv preprint arXiv: 1910.10683, 2019, 67 pages.
Ren S., et al., "Faster R-CNN: Towards Real-Time Object Detection With Region Proposal Networks," Advances in Neural Information Processing Systems, 2015, pp. 91-99.
Rhinehart N., et al., "First-Person Activity Forecasting with Online Inverse Reinforcement Learning," The IEEE International Conference on Computer Vision (ICCV), 2017, pp. 3696-3705.
Richard A., et al., "Weakly Supervised Action Learning with RNN Based Fine-to-Coarse Modeling," In IEEE Conference on Computer Vision and Pattern Recognition (CVPR), 2017, pp. 754-763.
Rodriguez C., et al., "Action Anticipation by Predicting Future Dynamic Images," European Conference on Computer Vision (ECCV) Workshop, 2018, pp. 1-16.
Sener F., et al., "Technical Report: Temporal Aggregate Representations," arXiv:2106.03152, 2021, 4 pages.
Sener F., et al., "Temporal Aggregate Representations for Long-Range Video Understanding," In European Conference on Computer Vision (ECCV), Jul. 30, 2020, 23 pages.
Shi Y., et al., "Action Anticipation with RBF Kernelized Feature Mapping RNN," European Conference on Computer Vision (ECCV), 2018, pp. 1-17.
Shou M.Z., et al., "Generic Event Boundary Detection: A Benchmark for Event Segmentation," arXiv: 2101.10511, 2021, 15 pages.
Simonyan K., et al., "Two-Stream Convolutional Networks for Action Recognition in Videos, " Advances in Neural Information Processing Systems, 2014, vol. 27, pp. 568-576.
Soomro K., et al., "UCF101: A Dataset of 101 Human Actions Classes From Videos in The Wild," arXiv:1212.0402v1 [cs.CV], Dec. 3, 2012, 7 pages.
Stein S., et al., "Combining Embedded Accelerometers with Computer Vision for Recognizing Food Preparation Activities," UbiComp, Sep. 2013, pp. 729-738.
Sun C., et al., "Contrastive Bidirectional Transformer for Temporal Representation Learning," arXiv preprint arXiv: 1906.05743, 2019.
Sun C., et al., "VideoBERT: A Joint Model for Video and Language Representation Learning," Proceedings of the IEEE/CVF International Conference on Computer Vision (ICCV), 2019, pp. 7464-7473.
Touvron H., et al., "Training Data-Efficient Image Transformers and Distillation Through Attention," In International Conference on Machine Learning (ICML), 2021, 11 pages.
Tran D., et al., "A Closer Look at Spatiotemporal Convolutions for Action Recognition," Proceedings of the IEEE Conference on Computer Vision and Pattern Recognition (CVPR), 2018, pp. 6450-6459.
Tran D., et al., "Learning Spatiotemporal Features with 3D Convolutional Networks," Proceedings of the IEEE International Conference on Computer Vision (ICCV), 2015, pp. 4489-4497.
Tran D., et al., "Video Classification with Channel-Separated Convolutional Networks," Proceedings of the IEEE/CVF International Conference on Computer Vision (ICCV), 2019, pp. 5551-5560.
Vaswani A., et al., "Attention Is All You Need," Advances in Neural Information Processing Systems, December (NIPS), 2017, pp. 5998-6008.
Vondrick C., et al., "Anticipating Visual Representations from Unlabeled Video," Computer Vision and Pattern Recognition (CVPR), 2016, pp. 98-106.
Wang L., et al., "Temporal Segment Networks: Towards Good Practices for Deep Action Recognition," In European Conference on Computer Vision (ECCV), Sep. 17, 2016, 17 pages.
Wang Q., et al., "Learning Deep Transformer Models for Machine Translation," 2019, In ACL, arXiv:1906.01787v1 [cs.CL], 13 pages.
Wang X., et al., "Non-Local Neural Networks, " Proceedings of the IEEE Conference on Computer Vision and Pattern Recognition (CVPR), 2018, pp. 7794-7803.
Wei D., et al., "Learning and Using the Arrow of Time," Proceedings of the IEEE Conference on Computer Vision and Pattern Recognition (CVPR), 2018, pp. 8052-8060.
Wu C., et al., "Long-Term Feature Banks for Detailed Video Understanding," In Proceedings of the IEEE/CVF Conference onComputer Vision and Pattern Recognition, 2019, pp. 284-293.
Xie S., et al., "Rethinking Spatiotemporal Feature Learning: Speed-Accuracy Trade-offs in Video Classification," Proceedings of the European Conference on Computer Vision (ECCV), 2018, pp. 318-335, DOI: 10.1007/978-3-030-01267-0_19.
Yamamuro Y., et al., Submission to Epic-Kitchens Action Anticipation Challenge 2021, In IEEE Conference on Computer Vision and Pattern Recognition (CVPR), 2021, 4 pages.
Yang C., et al., "Video Representation Learning With Visual Tempo Consistency," 2020, In arXiv preprint arXiv:2006.15489, 11 pages.
Yu Y., et al., "Learning to Anticipate Egocentric Actions by Imagination," IEEE Transactions on Image Processing, 2021, vol. 30, 10 pages.
Zatsarynna O., et al., "Multi-Modal Temporal Convolutional Network for Anticipating Actions in Egocentric Videos," In CVPR Workshop, 2021, 10 pages.
Zhang Y., et al., "VidTr: Video Transformer without Convolutions," arXiv:2104.11746, 2021, 11 pages.

(56) References Cited

OTHER PUBLICATIONS

Abnar S., et al., "Quantifying Attention Flow in Transformers," Artificial Intelligence Computation and Language (ACL), May 31, 2020, 8pages.

Arandjelovic R., et al., "Look, Listen and Learn," International Conference on Computer Vision (ICCV), 2017, pp. 609-617.

Arnab A., et al., "ViVIT: A Video Vision Transformer," IEEE/CVF International Conference on Computer Vision (ICCV), 2021, pp. 6836-6846.

Bertasius G., et al., "Classifying, Segmenting, and Tracking Object Instances in Video with Mask Propagation," IEEE/CVF Conference on Computer Vision and Pattern Recognition (CVPR), 2020, pp. 9739-9748.

Bertasius G., et al., "Cobe: Contextualized Object Embeddings from Narrated Instructional Video," In Neural Information Processing Systems 33 (NeurIPS 2020), 2020, 13 pages.

Bertasius G, et al., "Is Space-Time Attention All You Need for Video Understanding?," Proceedings of the 38th International Conference on Machine Learning, PMLR 139, 2021, 11 pages.

Brown T.B., et al., "Language Models are Few-Shot Learners," arXiv:2005.14165, 2020, 75 pages.

Buades A., et al., "A Non-Local Algorithm for Image Denoising," IEEE Computer Society Conference on Computer Vision and Pattern Recognition (CVPR), 2005, 6 pages.

Cao Y., et al., "GcNet: Non-Local Networks Meet Squeeze-Excitation Networks and Beyond," In IEEE/CVF International Conference on Computer Vision (ICCV), 2019, 10 pages.

Carion N., et al., "End-to-End Object Detection with Transformers," In European Conference Computer Vision (ECCV), 2020, 26 pages.

Carreira J., et al., "Quo Vadis, Action Recognition? A New Model and The Kinetics Dataset," Proceedings of the IEEE Conference on Computer Vision and Pattern Recognition (CVPR), 2017, pp. 6299-6308.

Damen D., et al., "Rescaling Egocentric Vision: Collection Pipeline and Challenges for Epic-Kitchens-100," arXiv preprint arXiv:2006.13256, Sep. 17, 2021, 20 pages.

Damen D., et al., "Scaling Egocentric Vision: The EPIC-KITCHENS Dataset", The European Conference on Computer Vision (ECCV), 2018, pp. 720-736.

De G.R., et al., "Modeling Temporal Structure with LSTM for Online Action Detection," IEEE Winter Conference on Applications of Computer Vision (WACV), 2018, 9 pages.

Dessalene E., et al., "Forecasting Action through Contact Representations from First Person Video," IEEE Transactions on Pattern Analysis and Machine Intelligence (TPAMI), 2021, 12 pages.

Devlin J., et al., "BERT: Pre-Training of Deep Bidirectional Transformers for Language Understanding," In Proceedings of the 2019Conference of the North American Chapter of the Association for ComputationalLinguistics: Human Language Tech-nologies, vol. 1 (Long and Short Papers), 2019, 16 pages.

Dosovitskiy A., et al., "An Image is Worth 16x16 words: Transformers for Image Recognition at Scale," International Conference on Learning (ICLR), 2021, 21 pages.

Fan H., et al., "Multiscale Vision Transformers," In IEEE/CVF International Conference on Computer Vision (ICCV), 2021, pp. 6824-6835.

Farha Y.A., et al., "When will you do what?—Anticipating Temporal Occurrences of Activities," IEEE Conference on Computer Vision and Pattern Recognition (CVPR), 2018, pp. 5343-5352.

Feichtenhofer C., et al., "SlowFast Networks for Video Recognition," Proceedings of the IEEE/CVF International Conference on Computer Vision (ICCV), 2019, pp. 6202-6211.

Fernando B., et al., "Self-Supervised Video Representation Learning With Odd-One-Out Networks," Proceedings of the IEEE Conference on Computer Vision and Pattern Recognition (CVPR), 2017, pp. 3636-3645.

Furnari A., et al., "Leveraging Uncertainty to Rethink Loss Functions and Evaluation Measures for Egocentric Action Anticipation," European Conference on Computer Vision (ECCV), 2018, 17 pages.

Furnari A., et al., "Rolling-Unrolling LSTMs for Action Anticipation from First-Person Video," IEEE Transactions on Pattern Analysis and Machine Intelligence (TPAMI), 2020, 16 pages.

Furnari A., et al., "What Would you Expect? Anticipating Egocentric Actions With Rolling-Unrolling LSTMs and Modality Attention", The IEEE/CVF International Conference on Computer Vision (ICCV), 2019, pp. 6252-6261.

Gammulle H., et al., "Predicting the Future: A Jointly Learnt Model for Action Anticipation," International Conference on Computer Vision (ICCV), 2019, pp. 5562-5571.

Gao J., et al., "Red: Reinforced Encoder-Decoder Networks for Action Anticipation," The British Machine Vision Conference (BMVC), 2017, 11 pages.

Ghadiyaram D., et al., "Largescale Weakly-Supervised Pre-Training for Video Action Recognition," In Proceedings of the IEEE Conference on Computer Vision and Pattern Recognition, 2019, pp. 12046-12055.

Girdhar R., et al., "ActionVLAD: Learning Spatio-Temporal Aggregation for Action Classification," Proceedings of the IEEE Conference on Computer Vision and Pattern Recognition (CVPR), 2017, pp. 971-980.

Girdhar R., et al., "Anticipative Video Transformer @ EPIC-Kitchens Action Anticipation Challenge 2021," Conference on Computer Vision and Pattern (CVPR), 2021, 5 pages.

Girdhar R., et al., "Attentional Pooling for Action Recognition," Conference on Neural Information Processing Systems (NeurIPS), 2017, 12 pages.

Girdhar R., et al., "CATER: A Diagnostic Dataset for Compositional Actions and TEmporal Reasoning," International Conference on Learning Representations (ICLR), Apr. 5, 2020, 16 pages.

Girdhar R., et al., "Video Action Transformer Network," In IEEE Conference on Computer Vision and Pattern Recognition, CVPR, 2019, pp. 244-253.

Goyal P., et al., "Accurate, Large Minibatch SGD: Training ImageNet in 1 Hour," arXiv preprint, arXiv: 1706.02677, Apr. 30, 2018, 12 pages.

Goyal R., et al., "The "Something Something" Video Database for Learning and Evaluating Visual Common Sense," Proceedings of the IEEE International Conference on Computer Vision (ICCV), 2017, pp. 5842-5850.

Gu X., et al., "Transaction: ICL-SJTU Submission to Epic-Kitchens Action Anticipation Challenge 2021," Computer Vision and Pattern Recognition (CVPR), Jul. 28, 2021, 4 pages.

Han T., et al., "Memory-Augmented Dense Predictive Coding for Video Representation Learning," In European Conference on Computer Vision (ECCV), Aug. 3, 2020, 23 pages.

Han T., et al., "Video Representation Learning by Dense Predictive Coding," IEEE/CVF International Conference on Computer Vision (ICCV), 2019, 10 pages.

Huang D.A., et al., "Action-Reaction: Fore-Casting the Dynamics of Human Interaction," European Conference on Computer Vision (ECCV), 2014, pp. 489-504.

Jain A., et al., "Recurrent Neural Networks for Driver Activity Anticipation via Sensory-Fusion Architecture," IEEE International Conference on Robotics and Automation (ICRA), Sep. 16, 2015, 8 pages.

Jayaraman D., et al., "Learning Image Representations Tied to Ego-Motion," In IEEE International Conference on Computer Vision (ICCV), 2015, pp. 1413-1421.

Jayaraman D., et al., "Slow and Steady Feature Analysis: Higher Order Temporal Coherence in Video," Proceedings of the IEEE Conference on Computer Vision and Pattern Recognition (CVPR), 2016, pp. 3852-3861.

Karpathy A., et al., "Large-scale Video Classification with Convolutional Neural Networks," In Proceedings of 2014 EEE Conference on Computer Vision and Pattern Recognition, Computer Science Department, Stanford University, Jun. 2014, 8 pages.

Kay W., et al., "The Kinetics Human Action Video Dataset," arXiv preprint, arXiv :1705.06950, May 19, 2017, 22 pages.

Kim D., et al., "Self- Supervised Video Representation Learning with Space-Time Cubic Puzzles," In Proceedings of the AAAI Conference on Artificial Intelligence, 2019, vol. 33, pp. 8545-8552.

(56) References Cited

OTHER PUBLICATIONS

Kitani K.M., et al., "Activity forecasting," European Conference on Computer Vision (ECCV), 2012, 14 pages.

Kong S., et al., "Low-Rank Bilinear Pooling for Fine-Grained Classification," IEEE Conference on Computer Vision and Pattern Recognition (CVPR), 2017, pp. 365-374.

Koppula H.S., et al., "Anticipating Human Activities using Object Affordances for Reactive Robotic Response," IEEE Transactions on Pattern Analysis and Machine Intelligence (TPAMI), vol. 38, Issue No. 1, May 2015, pp. 14-29.

Korbar B., et al., "Cooperative Learning of Audio and Video Models from Self-Supervised Synchronization," Advances in Neural Information Processing Systems (NeurIPS), 2018, 12 pages.

Kuehne H., et al., "HMDB: A Large Video Database for Human Motion Recognition," 2011 International Conference on Computer Vision, DOI: 10.1109/ICCV.2011.6126543, 2011, 9 Pages.

Kuehne H., et al., "The Language of Actions: Recovering the Syntax and Semantics of Goal-Directed Human Activities," Computer Vision and Pattern Recognition (CVPR), 2014, pp. 780-787.

International Search report and Written Opinion for International Application No. PCT/US2023/023490, mailed Jul. 25, 2023, 6 pages.

\* cited by examiner

ANTICIPATIVE VIDEO TRANSFORMER MODEL FOR FUTURE ACTION ANTICIPATION

TECHNICAL FIELD

This disclosure generally relates to anticipating future actions using a machine-learning model. In particular, the disclosure relates to anticipating future actions or predicting future action tasks given a video clip using an anticipative video transformer architecture.

BACKGROUND

Every day, people make countless decisions based on their understanding of their surroundings as a continuous sequence of events. Artificial Intelligence (AI) systems that can predict people's future activities are critical for applications ranging from self-driving automobiles to augmented reality. However, anticipating future activities or actions is a challenging task for AI since it necessitates predicting the multimodal distribution of future activities and modeling the course of previous actions. As an example, consider an autonomous vehicle at a stop sign that needs to predict whether a pedestrian will cross the street or not. Making this determination requires modeling complex visual signals including past actions of the pedestrian, such as speed and direction of walking, and using these visual signals to predict what they may do next. As another example, a user building a dresser may find themselves wondering whether the next step is to attach the legs or the drawers of the dresser. A friend of the user could helpfully suggest which part to add based on the steps followed so far. However, this type of anticipation by an AI system requires predicting the multimodal distribution of future activities as well as modeling the progression of past actions. Similarly, imagine an augmented reality (AR) device that observes a user's activity from a wearable camera, e.g., as they cook a new dish or assemble a piece of furniture, and needs to anticipate their next steps to provide timely assistance. In many such applications, it is insufficient to recognize what is happening in the video. Rather, the vision system must also anticipate the likely actions that are to follow. Hence, there is a growing interest in formalizing the activity anticipation task along with development of multiple challenge benchmarks to support it.

Compared to traditional action recognition, anticipation tends to be significantly more challenging. First, it requires going beyond classifying current spatiotemporal visual patterns into a single action category (a task nicely suited to today's well-honed discriminative models) to instead predict the multi-model distribution of future activities. Moreover, while action recognition can often side-step temporal reasoning by leveraging instantaneous contextual cues, anticipation inherently requires modeling the progression of past actions to predict the future. For instance, the presence of a plate of food with a fork may be sufficient to indicate the action of eating, whereas anticipating that same action would require recognizing and reasoning over the sequence of actions that precede it, such as chopping, cooking, serving, etc. Indeed, recent work finds that modeling long temporal context is often critical for anticipation, unlike action recognition where frame-level modeling is often enough. These challenges are also borne out in practice. For example, accuracy for one of today's top performing video models drops from 42% to 17% when treating recognition versus anticipation on the same test clips. In other words, predicting even one second into the future is much harder than declaring the current action.

The typical approach to solving long-term predictive reasoning tasks involves extracting frame or clip level features using standard architectures, followed by aggregation using clustering, recurrence, or attention-based models. Except the recurrent ones, most such models merely aggregate features over the temporal extent, with little regard to modeling the sequential temporal evolution of the video over frames. While recurrent models like LSTMs have been explored for anticipation, they are known to struggle with modeling long-range temporal dependencies due to their sequential (non-parallel) nature. Recent work mitigates this limitation using attention-based aggregation over different amounts of the context to produce short-term ('recent') and long-term ('spanning') features. However, it still reduces the video to multiple aggregate representations and loses its sequential nature. Moreover, it relies on careful and dataset-specific tuning of the architecture and the amounts of context used for the different aggregate features.

As discussed above, most prior approaches for future action anticipation struggle with modeling the sequential sequence of actions they've already performed. Accordingly, there is a need for an approach that can anticipate future actions in videos (e.g., egocentric videos) in an effective and accurate manner.

SUMMARY OF PARTICULAR EMBODIMENTS

Embodiments described herein relate to a machine learning (ML) model (also interchangeably referred to herein as an anticipative video transformer (AVT) model/architecture) to process a sequence of image frames in a video clip to predict a next action in the video sequence and learn to encode features of the frames so that the encoded features are predictive of successive features. The AVT model is an end-to-end attention-based video modeling architecture that attends to previously observed frames in a video to anticipate future actions. The model is trained to jointly predict the next action in a video sequence, while also learning frame feature encoders that are predictive of successive future frames' features. Compared to existing temporal aggregation strategies, the AVT model has the advantage of both maintaining the sequential progression of observed actions while still capturing long-range dependencies, which are both critical for the anticipation task. For instance, compared with previous approaches, the AVT model is better at understanding long-range dependencies, like how someone's past cooking steps indicate what they will do next. The AVT model discussed herein could be especially useful for applications such as an AR "action coach" or an AI assistant, by prompting someone that they may be about to make a mistake in completing a task or by reacting ahead of time with a helpful prompt for the next step in a task. For example, the AVT model could warn someone that the pan they're about to pick up is hot based on the person's previous interactions with the pan.

In particular embodiments, the AVT model's architecture consists of two parts, which includes an attention-based backbone component (AVT-b) that operates on frames of video and an attention-based head component (AVT-h) that operates on features extracted by the backbone component to predict future features and actions. The backbone component may also be compatible with traditional video backbones like three-dimensional (3D) convolutional networks. In particular embodiments, the backbone component of the AVT model is based on the vision transformer (ViT) architecture. The backbone component divides image frames into non-overlapping patches, uses a feedforward network to embed them, adds a particular classification/categorization token, and applies multiple levels of multi-head self-attention using a transformer encoder. The weights are then shared across the frames, and the features corresponding to the categorization token are used for the head architecture/component for it to predict future features and/or actions.

In particular embodiments, the head component of the AVT model takes the per-frame features from the backbone component and applies another transformer architecture with causal attention. This means that it evaluates or considers features only from the current and preceding/previous frames. As a result, the AVT model can generate a representation (e.g., future action feature and/or classification) of every specific frame only based on previous features.

In particular embodiments, the AVT model for predicting future actions is trained based on three losses or loss functions. First, to predict labeled future action, the model is trained to classify the features in the last frame of a video clip. Second, the model is trained to regress the intermediate frame features to the features of the succeeding frames, which trains the model to predict what comes next. Finally, the model is trained to classify intermediate action classes. By jointly optimizing the three losses, the AVT model predicts future actions 10-30% better than models trained only with bidirectional attention. These additional losses make the AVT model better suited for long-range reasoning because they provide additional supervision for the model. It also demonstrates that its performance improves by incorporating longer and longer context.

The AVT model for future action anticipation discussed herein is advantageous in several aspects. As an example and not by way of limitation, the AVT model is attention based, so it can process a full sequence in parallel. In contrast, recurrent neural network-based approaches often forget the past, as they need to be processed sequentially. As another example and not by way of limitation, the AVT model is based on loss functions that encourage the model to capture the sequential nature of video, which would otherwise be lost by attention-based architectures such as non-local networks.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF EXAMPLE EMBODIMENTS

Particular embodiments described herein relates to a machine learning (ML) model (also interchangeably referred to herein as an anticipative video transformer (AVT) model/architecture) to process a sequence of image frames in a video clip to predict a next action in the video sequence and learn to encode features of the frames so that the encoded features are predictive of successive features. Compared to existing temporal aggregation strategies, the ML or the AVT model described herein has the advantage of both maintaining the sequential progression of observed actions (e.g., a user has cracked eggs and chopped onions) while still capturing long-range dependencies (e.g., there is a relationship between the cracked eggs and onions). For example, by observing the user cracking eggs and chopping onions, the ML model could predict that the user is going to make an omelet next.

In particular embodiments, the ML or the AVT model described herein is an end-to-end attention-based model that attends to a plurality or sequence of image frames in a video (e.g., egocentric video) to anticipate one or more future actions. Specifically, the AVT model is an alternate video modeling architecture that replaces aggregation-based temporal modeling with an anticipative architecture. Aiming to overcome the tradeoffs as discussed in the background section, the proposed AVT model naturally embraces the sequential nature of videos, while minimizing the limitations that arise with recurrent architectures. Similar to recurrent models, the AVT model can be rolled out indefinitely to predict further into the future (e.g., generate future predictions), yet it does so while processing the input in parallel with long-range attention, which is often lost in recurrent architectures.

In particular embodiments, the AVT model leverages the popular transformer architecture with casual masked attention, where each input frame is allowed to attend only to frames that precede it. The AVT model is trained to jointly predict the next action while also learning to predict future features that match the true future features and their corresponding intermediate action labels. For instance, FIG. 4, which is discussed later below, shows examples of how AVT's spatial and temporal attention spreads over previously observed frames for two of its future predictions: "wash tomato" and "turn-off tap". By incorporating intermediate future prediction losses, the AVT model encourages a predictive video representation that picks up patterns in how the visual activity is likely to unfold into the future.

Figure 4:
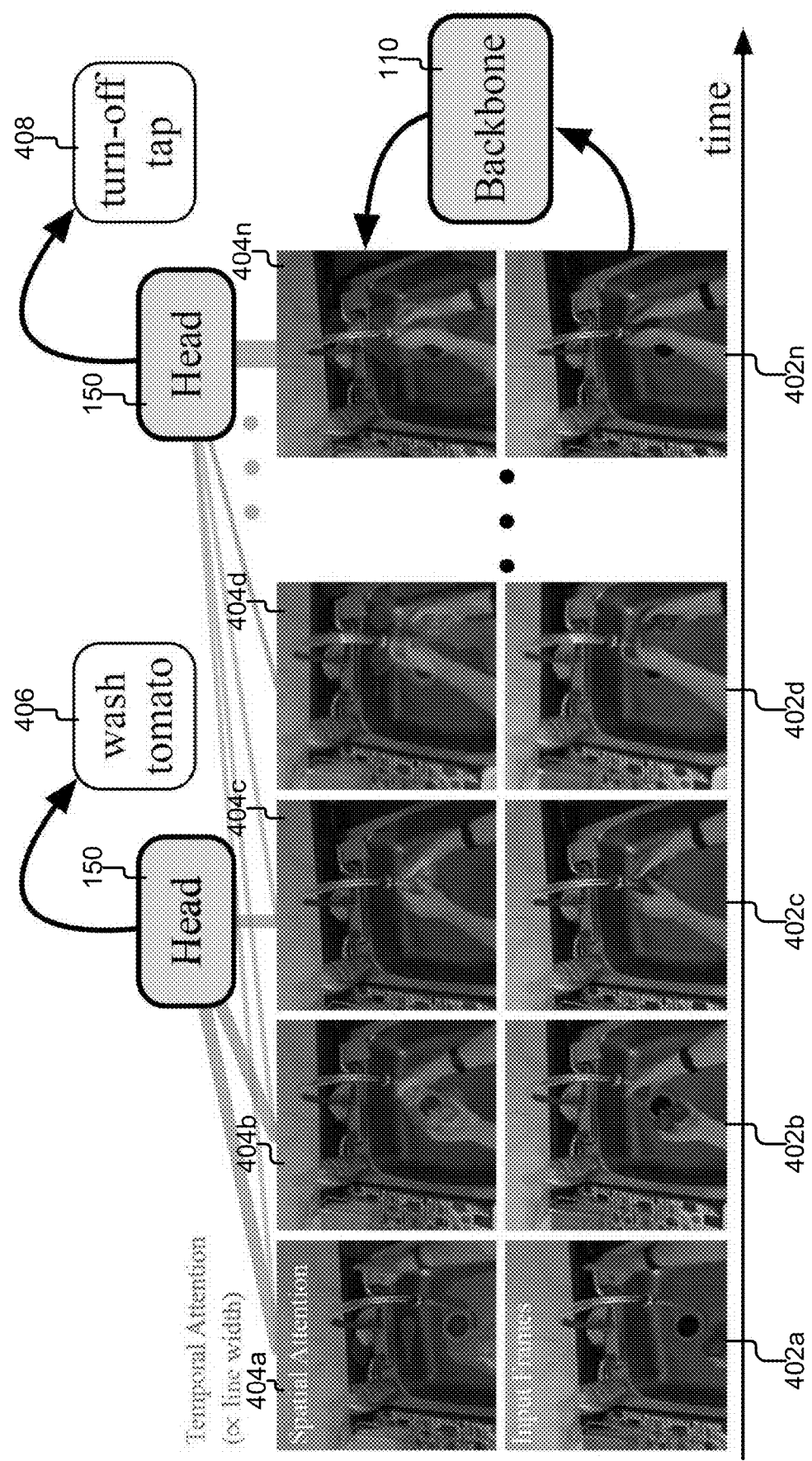
FIG. 4 illustrates example future action anticipations that may be made using the machine-learning model discussed herein, in accordance with particular embodiments.

While the AVT architecture described so far can be applied on top of various frames or clip encoders, the model has been further enhanced to a purely attention-based video modeling architecture by replacing a backbone component/architecture of the model with a spatial-attention-based frame encoder from the recently introduced vision transformer. This enables the AVT model to attend not only to specific frames, but also to spatial features within the frames in one unified framework. For instance, as shown in FIG. 4, when trained on egocentric video, the AVT model spontaneously learns to attend to spatial features corresponding to hands and objects, which tend to be especially important in anticipating future activities.

AVT Model Architecture

Figure 1:
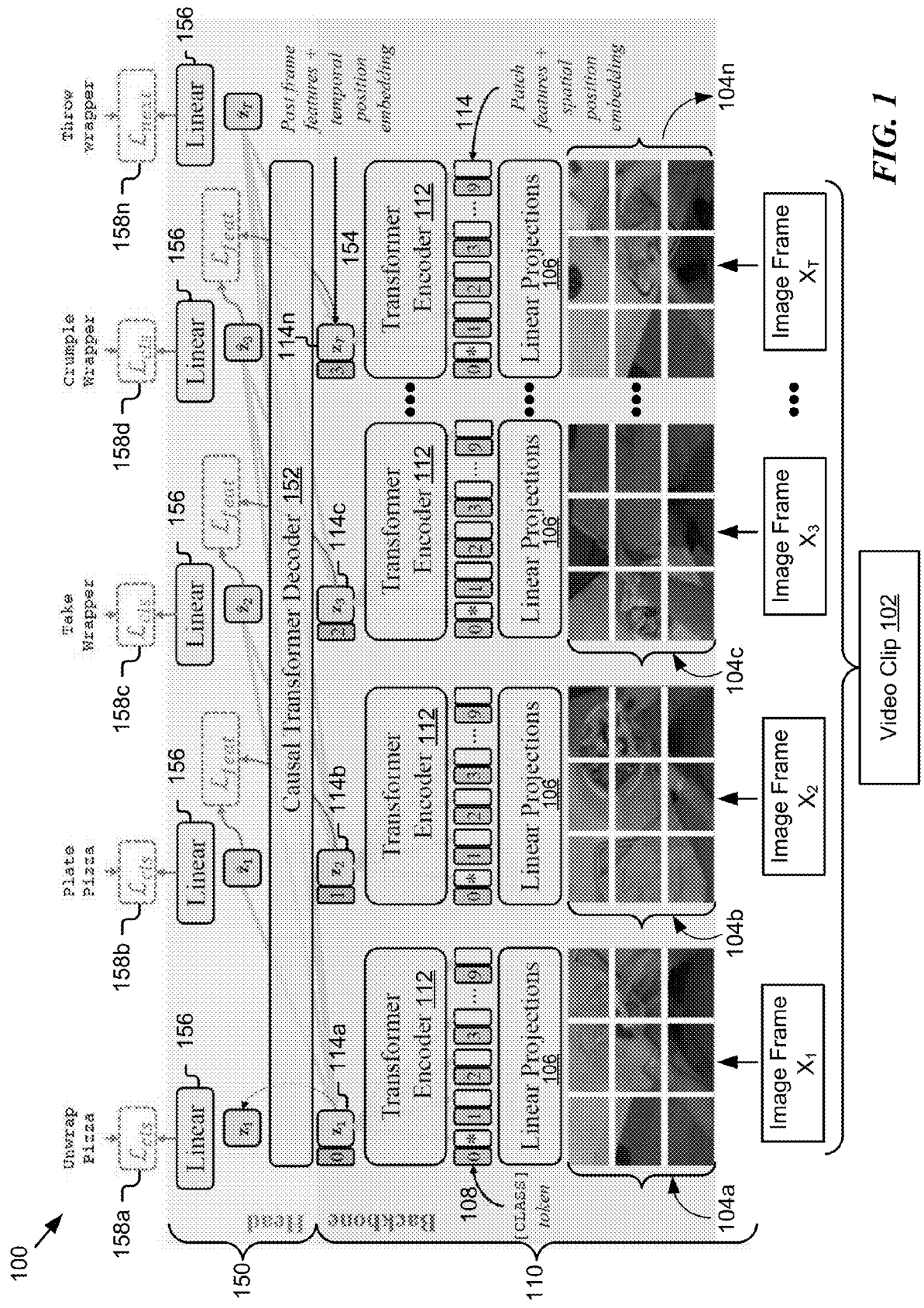
FIG. 1 illustrates an example architecture of a machine-learning model for future action anticipation, in accordance with particular embodiments.

The architecture of the AVT model discussed herein is a novel end-to-end purely attention-based architecture for predictive video modeling. It incorporates a self-supervised future prediction loss, which makes the AVT model especially applicable to predictive tasks like future action anticipation. FIG. 1 illustrates an example architecture 100 of the ML model (e.g., AVT model) for future action anticipation, in accordance with particular embodiments. The ML or AVT model is designed to predict future actions given a video clip as input. At a high level, the AVT model leverages a two-stage architecture, consisting of a backbone architecture 110 (also interchangeably referred to herein as a backbone component or AVT-b) that operates on individual frames or short clips (e.g., $X_1, X_2, \ldots, X_T$), followed by a head architecture 150 (also interchangeably referred to herein as a head component or AVT-h) that operates on the frame/clip level features (e.g., $Z_1, Z_2, \ldots, Z_T$) obtained from the backbone architecture 110 to predict future features and actions. In particular embodiments, the AVT model employs casual attention modeling (e.g., predicting the future actions based only on the frames observed so far) and is trained using objectives inspired from self-supervised learning. Each component of the AVT model architecture 100 is now discussed in detail below.

As illustrated, the process for future action anticipation begins with the backbone component 110. The backbone component 110 of the AVT model receives a video clip V (indicated by reference numeral 102) comprising of a plurality of image frames $X_1, X_2, \ldots, X_T$. These image frames may be sequential (e.g., displayed one after the other or occurring sequentially in time). In particular embodiments, the video clip 102 may be an egocentric video (e.g., a video via first person's point of view) captured using one or more cameras of a device worn by a user. For instance, the video may be captured and/or displayed using the display system 800 (shown in FIG. 8) or the display system 900 (shown in FIG. 9). In some embodiments, the device worn by the user may be an augmented-reality device.

At a high level, the backbone component 110 (denoted by B) extracts, using a spatial-attention encoder (i.e., transformer encoder 112), an image-frame feature or a feature representation $Z_t$ for each image frame $X_t$ at a time t, where $Z_t = B(X_t)$. In other words, the backbone component 110 generates an image-frame feature $Z_1$ (indicated by reference numeral 114a) corresponding to the image frame $X_1$, an image-frame feature $Z_2$ (indicated by reference numeral 114b) corresponding to the image frame $X_2$, an image-frame feature $Z_3$ (indicated by reference numeral 114c) corresponding to the image frame $X_3$, and an image-frame feature $Z_T$ (indicated by reference numeral 114n) corresponding to the image frame $X_T$. Using these image-frame features $Z_1, Z_2, \ldots, Z_T$ extracted by the backbone component 110, the head component or AVT-h 150 of the AVT model is used to predict future features $\hat{Z}_1, \hat{Z}_2, \ldots, \hat{Z}_T$ using a temporal-attention decoder or a casual transformer decoder 152, as discussed later below.

In particular embodiments, to generate the image-frame features or feature representations $Z_1, Z_2, \ldots, Z_T$, the backbone component 110 adopts a vision transformer (ViT) architecture, which has shown impressive results for static image classification. Using the ViT-B/16 architecture, each of the input frames $X_1, X_2, \ldots, X_T$ is first split into 16×16 non-overlapping patches, as indicated by reference numerals 104a, 104b, 104c, ..., 104n (individually or collectively herein referred to as 104). For instance, the image frame $X_1$ may be split into patches 104a, the image frame $X_2$ may be split into patches 104b, the image frame $X_3$ may be split into patches 104c, and the image frame $X_T$ may be split into patches 104n. Next, each patch 104 is flattened into a 256D vector and linearly projected, using linear projections 106, to 768D, which is the feature dimension used throughout the spatial-attention encoder or the transformer encoder 112. While there may not be a necessary need to classify each frame individually, a learnable classification token (e.g., [class] token) 108 may be prepended or added to the patch features. The output generated from such will be used as a frame-level embedding input to the head component 150. Finally, learned spatial position embeddings may be added to each patch feature, as indicated by reference numeral 114. In particular embodiments, frame-specific spatial position encodings have been chosen or used so that the same backbone model with shared weights can be applied to each frame. Temporal position information may be incorporated in the head architecture 150, as discussed later below. Once the classification token 108 and the spatial position embeddings 114 are added to the patch features, the resulting patch embeddings are passed through a spatial-attention encoder or the transformer encoder 112, which generates the image-frame features or feature representations $Z_1, Z_2, \ldots, Z_T$ corresponding to the image frames $X_1, X_2, \ldots, X_T$. For instance, at a high level, the transformer encoder 112 maps an input image frame into an abstract continuous representation (e.g., feature representation or image-frame feature) that holds all the learned information of that input.

Figure 2:
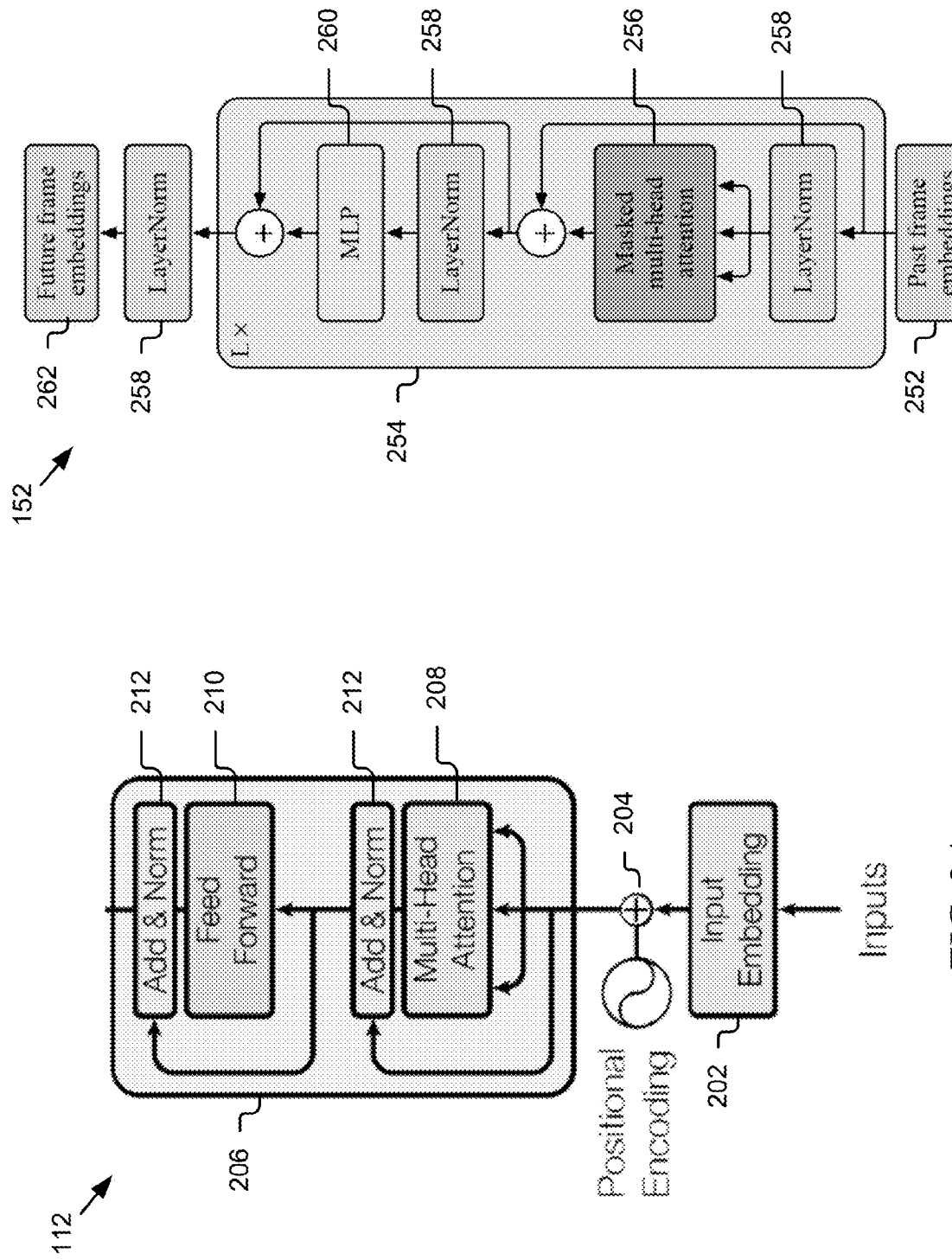
FIG. 2A illustrates an example architecture of a spatial-attention encoder or a transformer encoder, in accordance with particular embodiments.
FIG. 2B illustrates an example architecture of a temporal-attention decoder or a casual transformer decoder, in accordance with particular embodiments.

FIG. 2A illustrates an example architecture of a spatial-attention encoder or the transformer encoder 112, in accordance with particular embodiments. The transformer encoder 112 begins by receiving the input embeddings 202. The input embeddings 202 may include the patch-level embeddings (e.g., patch features plus the classification token 108 and spatial position embeddings 114), as discussed above. Next, positional information or encoding 204 may be injected into the embeddings 202. Because the transformer encoder 112 has no recurrence like recurrent neural networks, some information about the positions (e.g., position of objects in the image frame(s)) may need to be added into the input embeddings 202. This is done using positional encoding 204. Next, the resulting embedding (i.e., the input embeddings 202 plus positional encoding 204) may be passed through multiple layers 206 of the encoder 112. At a high level, the encoder layers 206 job is to map all input sequences into an abstract continuous representation that holds the learned information for that entire sequence. Although a single transformer encoder layer 206 is depicted in FIG. 2A, it should be understood that there may be multiple encoder layers 206, where results from a first layer of the transformer encoder 112 may be provided as input to a subsequent layer of the transformer encoder 112, and the results from the final layer of the transformer encoder 112 may be provided as input to the head component 150.

As illustrated in FIG. 2A, a particular encoder layer 206 may include two sub-modules, including a multi-head attention component 208, followed by a feed-forward network or layer 210. There may also be residual connections around each of the two sublayers followed by a layer normalization 212 (also interchangeably herein referred to as Add & Norm 212). In particular embodiments, the multi-head attention component 208 applies a specific attention mechanism called self-attention. Self-attention allows the AVT model to associate each object in an input image frame to other objects. More specifically, the multi-head attention component 208 is a component in the transformer encoder 112 that computes attention weights for the input and produces an output vector with encoded information on how each object should attend to other objects in the sequence of image frames. In other words, the multi-head attention component 208 determines which parts/portions of the input image frames in the video clip 102 are important. Stated differently, the multi-head attention component 208 may decide or determine what portions (e.g., objects) of the input video frames should the AVT model focus on or give attention to. As an example, with respect to the scenario depicted in FIG. 4, using the multi-head attention component 208, the AVT model spontaneously learns to attend to spatial features corresponding to hands and objects, which tend to be especially important in anticipating future activities.

The output vector produced by the multi-head attention component 208 is added to the original positional input embedding. This is called a residual connection. The output of the residual connection goes through a layer normalization 212. The normalized residual output gets projected through a pointwise feed-forward network 210 for further processing. In some embodiments, the pointwise feed-forward network 210 is a couple of linear layers with a ReLU activation in between. The output of that is then again added to the input of the pointwise feed-forward network 210 and further normalized. The residual connections help the network train, by allowing gradients to flow through the networks directly. The layer normalizations 212 are used to stabilize the network which results in substantially reducing the training time necessary. The pointwise feed-forward layer 210 is used to project the attention outputs potentially giving it a richer representation.

The operations performed by the transformer encoder 112, as discussed above, encode the input (e.g., image frame $X_t$ and associated information) into a continuous representation with attention information. This continuous representation with attention information is provided to the head component 150 and more specifically to the casual transformer decoder 152 in the form of image-frame feature or feature representation $Z_t$. This will help the decoder 152 focus on the appropriate portions in the input during the decoding process to generate a predicted future feature and/or action anticipation, as discussed in further detail below.

The backbone component or AVT-b 110, discussed above, is an attractive backbone design because it makes the AVT model architecture purely attentional. Nonetheless, in addition to AVT-b, the AVT model discussed herein is compatible with other video backbones, including those based on two-dimensional (2D) convolutional neural networks (CNNs), three-dimensional (3D) CNNs, or fixed feature representations based on detected objects or visual attributes. For the case of spatiotemporal backbones, which operate on clips as opposed to frames, features are extracted as $Z_t=B(X_{t-L}, \ldots, X_t)$, where the model is trained on L-length clips. This ensures the features at frame t do not incorporate any information from the future, which is not allowed in the anticipation problem setting.

Returning to FIG. 1, using the image-frame features $Z_1, Z_2, \ldots, Z_T$ extracted by the backbone component 110, the head network/component 150 of the AVT model is used to predict a future feature $\hat{Z}_t$ for each input frame using a temporal-attention decoder or a casual transformer decoder, D 152 as $\hat{Z}_1, \hat{Z}_2, \ldots, \hat{Z}_T=D(Z_1, Z_2, \ldots, Z_T)$. For instance, the casual transformer decoder 152 generates a predicted future feature $\hat{Z}_t$ corresponding to an image-frame feature $Z_t$ after attending to all features before and including it. In particular embodiments, the casual transformer decoder 152 may be implemented using a masked transformer decoder inspired from popular approaches in generative language modeling. For generating a predicted future feature $\hat{Z}_t$, the head component 150 first adds a temporal position encoding to each of the image-frame features $Z_1, Z_2, \ldots, Z_T$, as indicated by reference numeral 154. The temporal position embedding is implemented as a learned embedding of the absolute frame position within the clip. The embedded features (i.e., past frame features plus temporal position embedding) are passed through multiple decoder layers of the casual transformer decoder 152 to obtain future frame embeddings $\hat{Z}_1, \hat{Z}_2, \hat{Z}_3, \ldots, \hat{Z}_T$, as discussed in further detail below with respect to FIG. 2B.

FIG. 2B illustrates an example architecture of a temporal-attention decoder or casual transformer decoder 152, in accordance with particular embodiments. The casual transformer decoder 152 begins with receiving past frame embeddings 252. The past frame embeddings 252 may include past image-frame feature(s) plus temporal position embedding(s), as discussed above. The past frame embeddings 252 are passed through multiple decoder layers 254 of the casual transformer decoder 152 to obtain the future frame embeddings 262. Although a single transformer decoder layer 254 is depicted in FIG. 2B, it should be understood that this is not limiting and that there may be multiple decoder layers 254, where results from a first layer of the transformer decoder 152 may be provided as input to a subsequent layer of the transformer decoder 152, and the results from the final layer of the transformer decoder 152 corresponds to the future frame embeddings 262.

As depicted, a particular decoder layer 254 may consist of a masked multi-head attention component 256, a layer normalization 258 (also sometimes interchangeably referred to herein as LayerNorm (LN) 258), and a multi-layer perceptron (MLP) (or a feedforward artificial neural network) 260. It should be noted that some of the components of the decoder layer 254 are similar to the components of the encoder layer 206 and therefore, the description for these components will not be repeated here. For instance, the LayerNorm 258 is same as the Norm used in the Add & Norm 212, as shown and discussed in reference to FIG. 2A. Also, the MLP 260 is similar to the feed-forward network 210, as shown and discussed in reference to FIG. 2A. In some embodiments, the main difference between the encoder and decoder layers is the masked multi-head attention component 256 and its functioning. For instance, the masking operation in the multi-head attention component 256 ensures that the AVT model only attends to specific parts of the input, which in the case of predictive tasks, like discussed herein, is defined as a 'causal' mask. That is, for the output corresponding to the future after frame t (i.e., $\hat{Z}_t$, the mask is set to only attend to specific image-frame features (e.g., $Z_1, Z_2, \ldots, Z_T$). The final output, obtained after processing via components of one or more decoder layers 254, is then passed through another LN 258 to obtain the future frame embeddings 262 or predicted future features $Z_1, \hat{Z}_1, \hat{Z}_2, \hat{Z}_3, \ldots, \hat{Z}_T$.

Returning to FIG. 1, the predicted future features $Z_1, \hat{Z}_1, \hat{Z}_2, \hat{Z}_3, \ldots, \hat{Z}_T$ generated, using the casual transformer decoder 152, may be decoded into a distribution over semantic action classes 158a, 158b, 158c, . . . , 158n (individually and/or collectively herein referred to as 158) using a linear classifier 156 (denoted by θ). The linear classifier 156 may classify a predicted future feature $\hat{Z}_t$ into a predicted action class or label 158 for that particular feature. In particular embodiments, the action class/label 158 may be representative of an action task that is associated with the predicted future feature $\hat{Z}_t$ corresponding to an image frame at or after time t. As an example, the action class/label 158a classified for the predicted future feature $Z_1$ may represent an action task "Unwrap Pizza", the action class/label 158b classified for the predicted future feature $\hat{Z}_1$ may represent an action task "Plate Pizza", the action class/label 158c classified for the predicted future feature $\hat{Z}_2$ may represent an action task "Take Wrapper", the action class/label 158d classified for the predicted future feature $\hat{Z}_3$ may represent an action task "Crumple Wrapper", and the action class/label 158n classified for the predicted future feature $\hat{Z}_T$ may represent an action task "Throw Wrapper". In some embodiments, these action classes/labels 158 representing action tasks may be displayed on a device worn by the user. For instance, the action tasks may be displayed on a display system 800 (shown in FIG. 8) or a display system 900 (shown in FIG. 9). In some embodiments, the display system 800 or 900 may be an augmented-reality device.

In particular embodiments, the linear classifier 156 may classify a predicted future feature $\hat{Z}_t$ into an action class/label 158 as $\hat{Y}_t = \theta(\hat{Z}_t)$. The final prediction, $\hat{Y}_T$, is used as the AVT model's output for the next-action anticipation task (i.e., future action anticipation). Note that since the next action segment (T+1) is $T_a$ seconds from the last observed frame (T), frames are typically sampled at a stride of $T_a$ so that the AVT model learns to predict future features/actions at that frame rate. However, this is not limiting and it should be understood that the model is robust to other frame rate values as well.

In particular embodiments, the AVT model is trained based on three losses or loss functions to generate the predicted future features $Z_1, \hat{Z}_1, \hat{Z}_2, \hat{Z}_3, \ldots, \hat{Z}_T$, action classes 158a, 158b, 158c, . . . , 158n, and/or the final action prediction $\hat{Y}_T$. The training of the AVT model is discussed in detail later below.

The AVT model architecture discussed above is different from standard transformer architectures in several ways. By way of non-limiting examples, (1) the AVT model discussed herein processes visual information (e.g., video clip or image frames in a video) for future action anticipation tasks (e.g., what comes next in the video) rather than textual information for language modeling (e.g., sentence/word translation), which largely has been the case with the current transformer architectures, (2) the AVT model differs from the original/standard transformer decoder in terms of the final layer normalization (LN) and the masking operation in the multi-head attention, as shown and discussed in reference to FIG. 2B. The masking ensures that the AVT model only attends to specific parts of the input, which in the case of predictive tasks like discussed herein, is defined as a 'causal' mask. That is, for the output corresponding to the future after frame t (e.g., $\hat{Z}_t$, the mask is set to only attend to specific image-frame features, and (3) the AVT model design differs considerably from previous applications of language modeling architectures to video (e.g., VideoBERT). The AVT model operates directly on continuous clip embeddings instead of first clustering them into tokens, and it leverages causal attention to allow for anticipative training (as discussed later below), instead of needing masked language modeling (MLM) as in BERT. These properties make AVT model suited for predictive video tasks while allowing for the long-range reasoning that is often lost in recurrent architectures. While follow-up works to VideoBERT operate on raw clip features, they still leverage a MLM objective with bidirectional attention, with the primary goal of representation learning as opposed to future prediction, which is the primary goal of the AVT model discussed herein.

Training of AVT Model

In particular embodiments, the AVT model may be trained based on three losses or loss functions to generate the predicted future features $Z_1, \hat{Z}_1, \hat{Z}_2, \hat{Z}_3, \ldots, \hat{Z}_T$; action classes 158a, 158b, 158c, . . . , 158n; and/or the final action prediction $\hat{Y}_T$, as discussed above. To sample training data, for each labeled action segment in a given dataset, a clip preceding the labeled action segment and ending $T_a$ seconds before the start of the action may be sampled. The clip may be passed through the AVT model to obtain future predictions, and then the network may be supervised using three losses discussed below.

First, the next-action prediction (e.g., final action prediction $\hat{Y}_T$) may be supervised using a cross-entropy loss with a labeled future action ($C_{T+1}$) as follows:

$$\mathcal{L}_{next} = -\log \hat{y}_T[c_{T+1}].$$

Second, to leverage the causal structure of the AVT model, the model's intermediate future predictions are supervised at the feature level and the action class level. For the former, the predicted future features (e.g., $\hat{Z}_1, \hat{Z}_2, \hat{Z}_3$) are regressed to match the true future features that are present in the clip, as follows:

$$\mathcal{L}_{feat} = \sum_{t=1}^{T-1} \|\hat{z}_t - z_{t+1}\|_2^2.$$

In some embodiments, the second loss, as calculated above, is inspired from some of the previous works that show that anticipating future visual representations is an effective form of self-supervision, though typically for traditional action recognition tasks. Concurrent and recent work adopts similar objectives for anticipation tasks, but with recurrent architectures. Since the AVT model is always trained with the final supervised loss, there is no suffering from or concern of potential collapse during training that would necessitate the use of contrastive losses.

Third, as an action class level anticipative loss, any action labels available in the training dataset are leveraged to supervise the intermediate action class/label predictions (e.g., 158a, 158b, 158c, 158d). That is, when the input clip overlaps with any labeled action segments that precede the segment to be anticipated. Setting $C_t=-1$ for any earlier frames for which there are no labels, the third loss is incurred as follows:

$$\mathcal{L}_{cls} = \sum_{t=1}^{T-1} \mathcal{L}_{cls}^t; \mathcal{L}_{cls}^t = \begin{cases} -\log \hat{y}_t[c_{t+1}] & \text{if } c_{t+1} \geq 0 \\ 0 & \text{otherwise.} \end{cases}$$

Once the three losses or loss functions have been determined, the AVT model can be trained based on these losses as follows:

$$\mathcal{L} = \mathcal{L}_{next} + \mathcal{L}_{cls} + \mathcal{L}_{feat}$$

In particular embodiments, the AVT model trained based on above is referred to as the anticipative training setting. For comparison purposes, this anticipative training setting (i.e., training based on three losses) is compared with a naive setting, where a model is trained solely based only on the first loss or next-action anticipation loss i.e., $L=L_{next}$. Training based solely on next-action anticipation loss is referred to as the naive setting as it does not leverage the AVT model's causal attention structure, instead supervising only the final prediction which attends to the full input. The anticipative training setting (i.e., training based on three losses) leads to significant improvements over the naive setting (i.e., training based only on one loss), as shown in FIG. 3.

Figure 3:
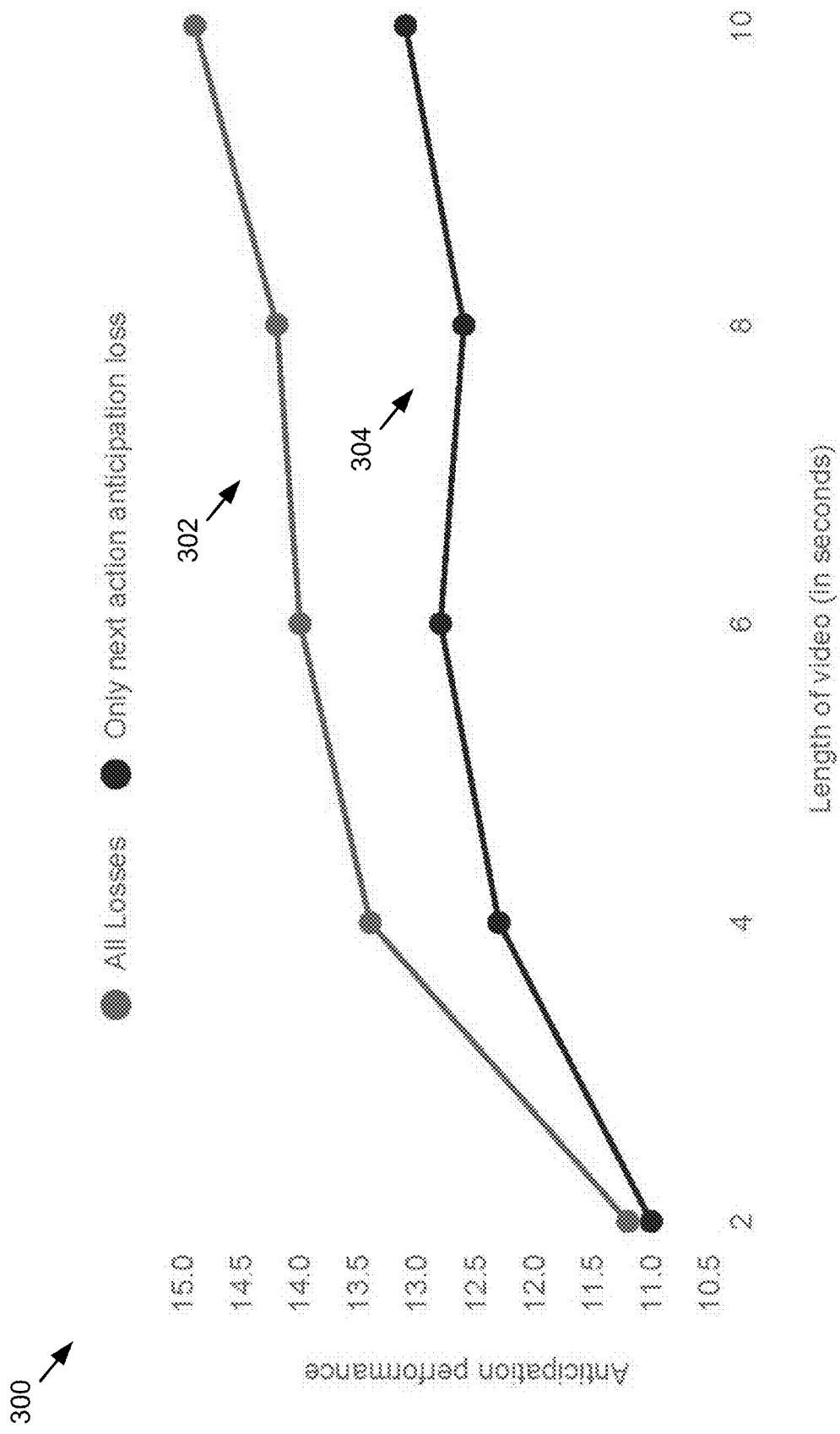
FIG. 3 illustrates an example performance comparison of a model for future action anticipation that is trained based on three losses with respect to a model trained based only on a single loss, in accordance with particular embodiments.

FIG. 3 illustrates an example performance comparison 300 of a model for future action anticipation that is trained based on three losses or anticipative training setting (indicated by reference numeral 302) with respect to a model trained based on a single loss or naive setting (indicated by reference numeral 304). As clearly demonstrated, the model trained in the anticipative training setting 302 (i.e., based on above three losses) is significantly more effective in predicting future actions (e.g., by 10% to 30%) than the model trained in the naive setting 304 (i.e., trained solely on bidirectional attention or one loss, such as only next action anticipation loss).

Example Inferences using AVT Model

In particular embodiments, the AVT model can be used at inference time to make one or more future action anticipations. FIG. 4 illustrates example future action anticipations or predictions that are made using the AVT model discussed herein, in accordance with particular embodiments. Specifically, FIG. 4 shows how AVT's spatial and temporal attention spreads over previously observed frames for two of its future action anticipations/predictions 406 and 408 corresponding to "wash tomato" and "turn-off tap" predictions, respectively. As discussed elsewhere herein, anticipating future actions using the AVT model involves encoding video frames 402a, 402b, 402c, 402d, . . . , 402n (individually and/or collectively herein referred to as 402) with a spatial-attention backbone (e.g., the backbone component or AVT-b 110 shown in FIG. 1), followed by a temporal-attention head (e.g., the head component or AVT-h 150 shown in FIG. 1) that attends only to frames before the current one to predict future actions (e.g., action tasks 406 and 408). In this example, the spatial-attention encoder of the AVT model spontaneously learns to attend to hands and objects (e.g., tomatoes) without being supervised to do so. The red regions represent the regions of highest attention. The temporal-attention decoder of the AVT model attends to frames most relevant to predict the next action. For example, to predict "wash tomato" action task 406, the head 150 (or the temporal-attention decoder) of the AVT model attends equally to all previous frames 402a, 402b, 402c and their corresponding image-frame features 404a, 404b, 404c as they determine if any more tomatoes need to be washed. Whereas for "turn-off tap" action task/prediction 408, the head 150 of the AVT model focuses most on the current frame 402n and/or its corresponding image-frame feature 404n for cues whether the person might be done. In other words, the AVT model first encodes the visual features from the tap being turned on, moves on to each tomato being washed, and finally predicts that the next action will be turning off the tap.

Figure 5A:
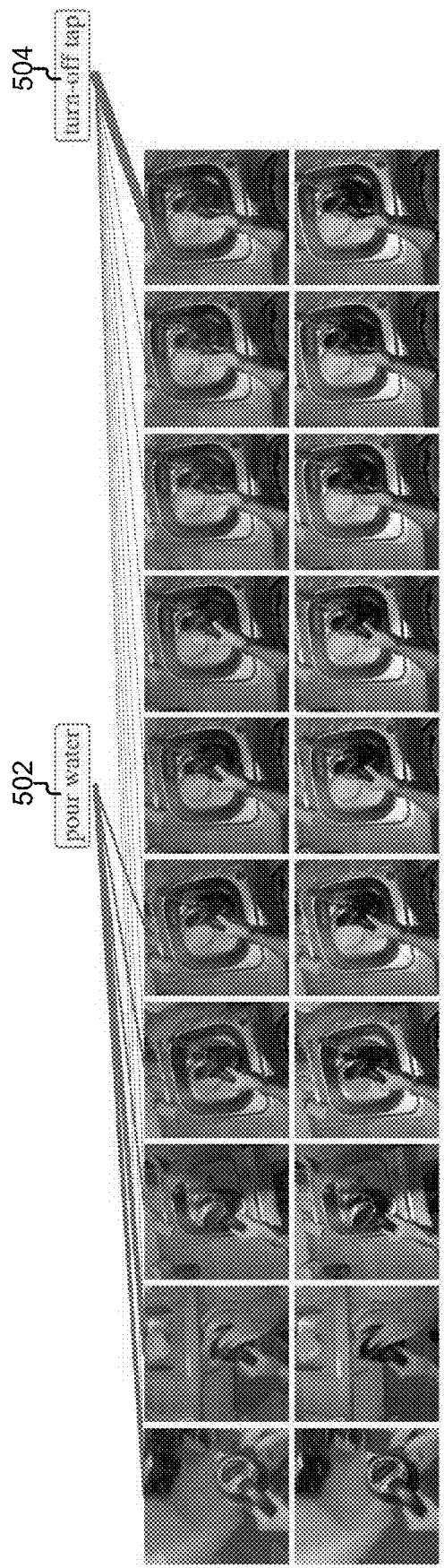
FIGS. 5A-5D illustrates some additional future action anticipations that may be made using the machine-learning model discussed herein, in accordance with particular embodiments.

FIGS. 5A-5D illustrates some additional future action anticipations or predictions that are made using the AVT model discussed herein, in accordance with particular embodiments. Specifically, FIG. 5A shows two example future action anticipations or predictions of two future action tasks 502 and 504 corresponding to "pour water" and "turn-off tap", respectively. The boldness/width of each line here in FIG. 5A or in other figures (e.g., FIGS. 4 and 5B-5D) indicates how much attention the AVT model gives to each frame and/or corresponding image-frame feature. For instance, to predict "pour water" action task 502, the AVT model attends almost equally to all previous frames and their corresponding image-frame features as they determine if any more water need to be poured. Whereas for "turn-off tap" action task/prediction 504, the AVT model focuses most on the current/last frame and/or its corresponding image-frame feature for cues whether the person is done pouring the water. In other words, the AVT model first encodes the visual features from the user holding the kettle and turning on the tap to pour water, moves on to water being poured, and finally predicts that the next action will be turning off the tap.

Figure 5B:
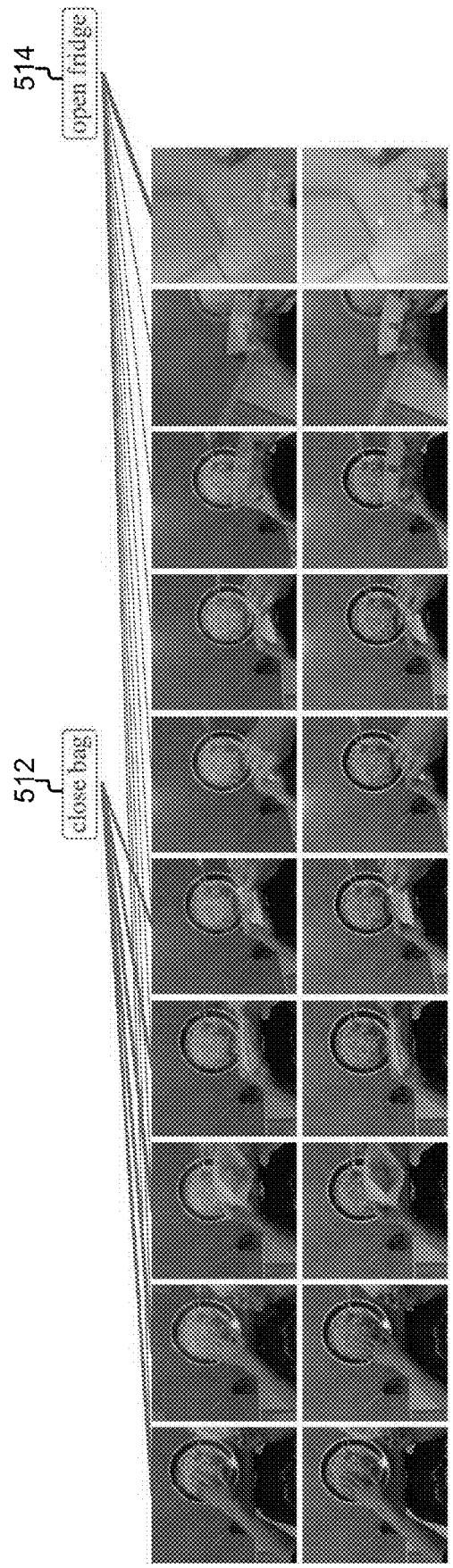

FIG. 5B shows yet another two example future action anticipations or predictions of two future action tasks 512 and 514 corresponding to "close bag" and "open fridge", respectively. Here, to predict "close bag" action task 512, the AVT model attends equally to all previous frames and their corresponding image-frame features and determines that the user is done putting the noodles in a bag and therefore predicts the next action task 512 to be "close bag". To predict "open fridge" action task/prediction 514, the AVT model here focuses uniformly on all frames as an action like this usually follows a sequence of actions involving packing up food items and moving towards the fridge to put the closed bag of noodles, and therefore predicts the next action task 514 to be "open fridge".

Figure 5C:
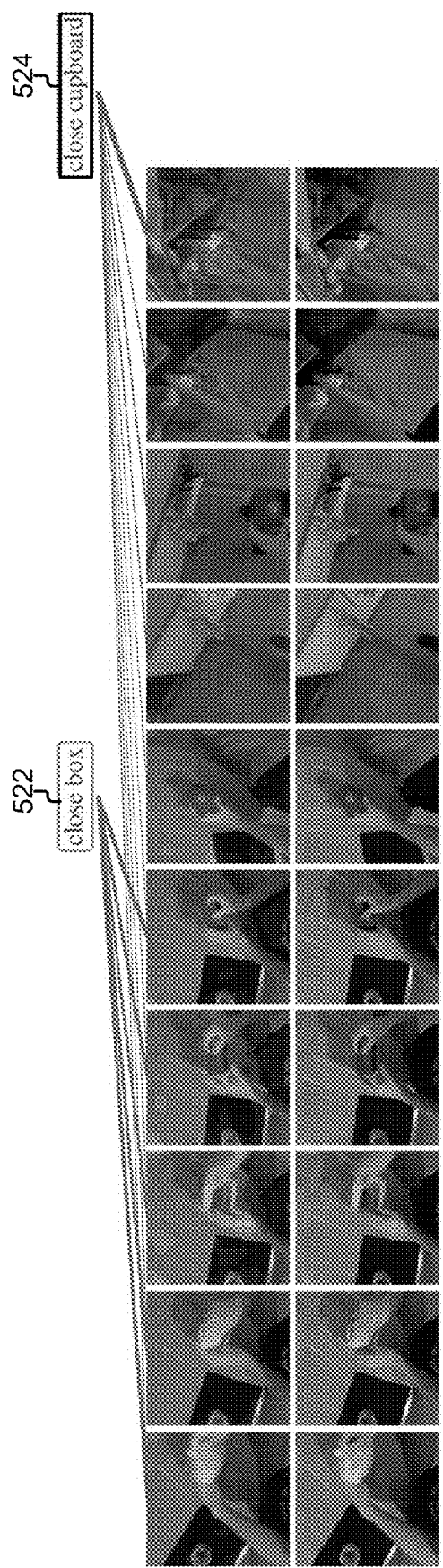
Figure 5D:
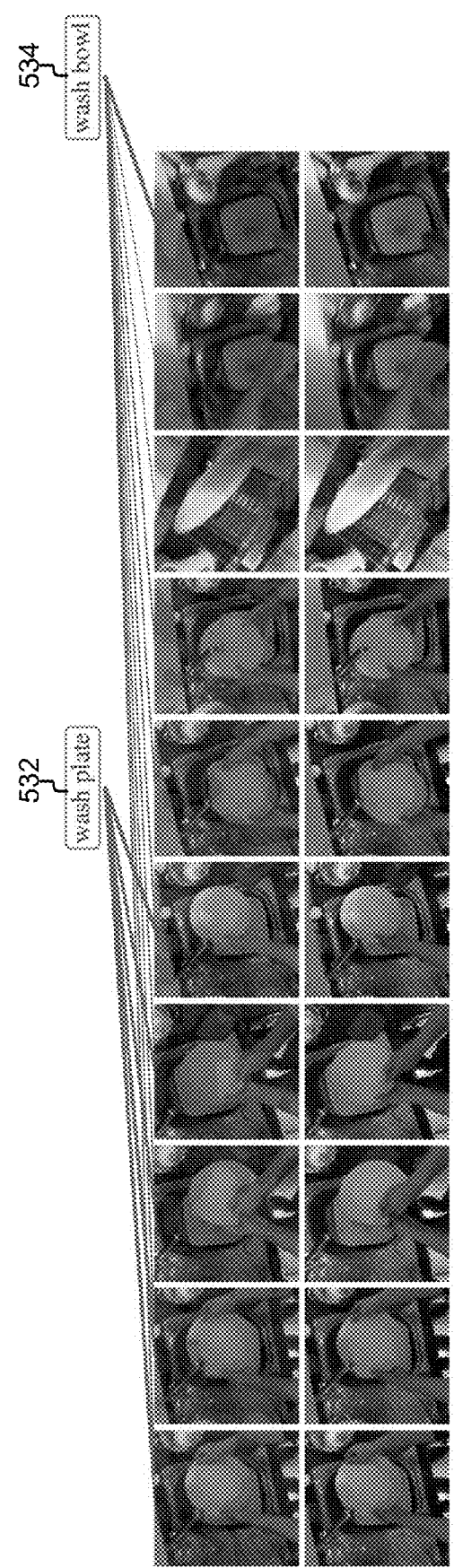

Similarly, FIG. 5C shows yet another two example future action anticipations or predictions of future action tasks 522 and 524 corresponding to "close box" and "close cupboard", respectively, by the AVT model discussed herein. FIG. 5D shows yet another two example future action anticipations or predictions of future action tasks 532 and 534 corresponding to "wash plate" and "wash bowl", respectively, by the AVT model discussed herein. As mentioned earlier, these future action anticipations or actions tasks may be displayed on a device worn by the user. For instance, the action tasks may be displayed on a display system 800 (shown in FIG. 8) or a display system 900 (shown in FIG. 9). In some embodiments, the display system 800 or 900 may be an augmented-reality device.

Figure 6:
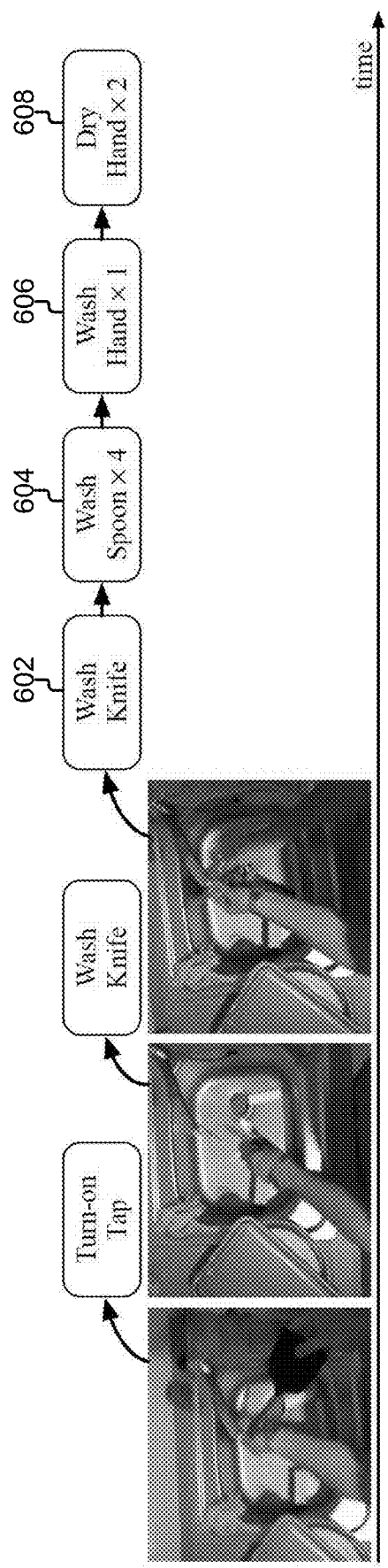
FIG. 6 illustrates an example of using the machine-learning model discussed herein for making a long-term anticipation, in accordance with particular embodiments.

In some embodiments, the AVT model discussed herein can also be used at inference time to make a long-term anticipation. FIG. 6 illustrates an example of using the AVT model for making a long-term anticipation. Apart from just next-action anticipation task (e.g., anticipating a single next future action) as discussed above, the AVT model can be rolled out autoregressively to predict a sequence of future actions 602, 604, 606, and 608 given the video context. Here, a predicted feature is appended at each iteration and then the AVT model is run on the resulting sequence, reusing features computed for past frames. As shown in FIG. 6, the AVT model makes reasonable future predictions—'wash spoon' 604 after 'wash knife' 602, followed by 'wash hand' 606 and then 'dry hand' 608.

It should be noted that the AVT model discussed herein is not limited to just next-action anticipation/prediction and long-term anticipation as discussed above, and that other numerous tasks by the AVT model are also possible and within the scope of the present disclosure. For instance, the AVT model may be useful for other tasks, such as self-supervising learning, finding action schemas and bounds, and even general action recognition in tasks that involve modeling the chronological sequence of actions.

Example Method for Future Action Anticipation

Figure 7:
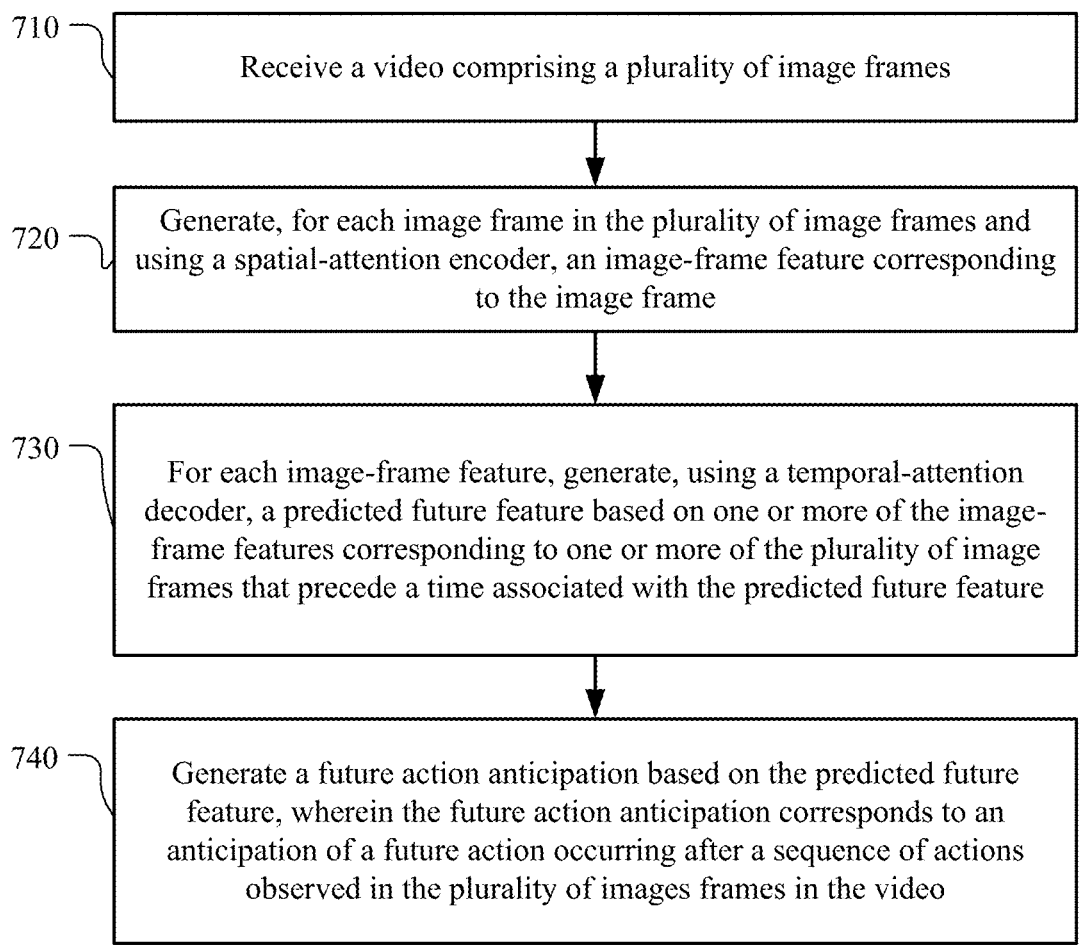
FIG. 7 illustrates an example method for generating a future action anticipation using the machine-learning model discussed herein, in accordance with particular embodiments.

FIG. 7 illustrates an example method 700 for generating a future action anticipation, in accordance with particular embodiments. Specifically, the method 700 illustrates steps performed by a machine-learning model (e.g., the AVT model) for anticipating a future action or task given a video clip. The method 700 may begin at step 710, where a computing system may receive a video comprising a plurality of image frames. The plurality of image frames may be sequential (e.g., displayed one after the other or occurring sequentially in time). In particular embodiments, the video may be an egocentric video (e.g., a video via first person's point of view) captured using one or more cameras of a device worn by a user. For instance, the video may be captured using the display system 800 (shown in FIG. 8) or the display system 900 (shown in FIG. 9). In particular embodiments, the device worn by the user may be an augmented-reality device.

At step 720, responsive to receiving the video comprising the plurality of image frames, the computing system may generate, for each image frame in the plurality of image frames and using a spatial-attention encoder, an image-frame feature corresponding to the image frame. The spatial-attention encoder is a transformer encoder 112 as shown in the backbone architecture 110 of the AVT model architecture in FIG. 1. The transformer encoder may include one or more of a multi-head attention component and a feed forward network, as shown in FIG. 2A. In particular embodiments, generating, using the spatial-attention encoder, the image-frame feature corresponding to the image frame may include splitting the image frame into a plurality of patches; determining, for each patch, a patch feature corresponding to the patch; adding, to each patch feature, a classification token and a spatial position embedding; and generating the feature corresponding to the image frame based on patch features and spatial position embeddings, as discussed above in reference to FIG. 1.

At step 730, for each image-frame feature generated by the spatial-attention encoder or the transformer encoder 112 in the backbone architecture 110, the computing system may generate, using a temporal-attention decoder, a predicted future feature based on one or more of the image-frame features corresponding to one or more of the plurality of image frames that precede a time associated with the predicted future feature. Stated differently, the computing system may generate, for each image-frame feature, a predicted future feature (e.g., next or subsequent image-frame feature) based on current image-frame feature corresponding to current image frame in the video and one or more preceding image-frame features corresponding to preceding image frames in the video. In some embodiments, responsive to generating a predicted future feature, the computing system may further generate a predicted action class or label corresponding to the predicted future feature using a linear classifier, as shown and discussed in reference to FIG. 1. These predicted future features and predicted action class labels may be used during the training of the machine-learning model (e.g., AVT model) for future action anticipation, as discussed elsewhere herein.

In particular embodiments, generating, using the temporal-attention decoder, the predicted future feature may include adding a temporal position encoding to each of the image-frame features generated using the spatial-attention encoder and generating the predicted future feature at a current image frame in the video after attending to image-frame feature corresponding to the current image frame and one or more image-frame features corresponding to one or more image frames preceding the current image frame in the video, as discussed above in reference to FIG. 1. In particular embodiments, the temporal-attention decoder discussed herein is a transformer decoder 152 with casual masked attention as shown in the head architecture 150 of the AVT model architecture in FIG. 1. The transformer decoder may include one or more of a casual masked multi-head attention component, a layer normalization, and a feed forward network, as shown in FIG. 2B. The casual masked multi-head attention ensures that the temporal-attention decoder attends to specific portions or image frames of the video for generating the future feature or future action anticipation.

At step 740, the computing system may generate a future action anticipation based on the predicted future feature. For instance, the computing system may generate the future action anticipation based on last predicted future feature of the video, as discussed in reference to FIG. 1. The future action anticipation may correspond to an anticipation of a future action occurring after a sequence of actions observed in the plurality of images frames in the video. In some embodiments, the sequence of actions observed in the plurality of image frames in the video may be associated with one or more action tasks. For example, as shown in FIG. 4, the sequence of actions observed in the plurality of image frames in the video may be associated with an action task "wash tomato", as indicated by reference numeral 406. In this case, the future action anticipation corresponds to a subsequent action task that is likely to be performed or followed after the one or more action tasks associated with the sequence of actions observed in the plurality of image frames in the video. For example, as shown in FIG. 4, the system discussed herein may anticipate the subsequent action task as "turn-off tap" (indicated by reference numeral 408) after the previous action task of "wash tomato" (indicated by reference numeral 406). In particular embodiments, the computing system may display the generated future action anticipation (e.g., subsequent action task) on a device worn by the user. For instance, the computing system may display the subsequent action task (e.g., turn-off tap) on the display system 800 (shown in FIG. 8) or the display system 900 (shown in FIG. 9). In particular embodiments, the device worn by the user is an augmented-reality device.

In addition to generating a future action anticipation (e.g., a subsequent or next action task), the computing system discussed herein is further capable of generating a long-term anticipation comprising a sequence of future actions occurring after the sequence of actions observed in the plurality of images frames in the video. For instance, the computing system may generate a series/plurality of future action tasks that that are likely to be performed or followed after the one or more action tasks associated with the sequence of actions observed in the plurality of image frames in the video, as shown and discussed in reference to FIG. 6. It should be understood that the computing system is not limited to just generating the future action anticipation and long-term anticipation as discussed herein, and that other numerous tasks/anticipations are also possible and within the scope of the present disclosure. For instance, the computing system may be useful for other tasks, such as self-supervising learning, finding action schemas and bounds, and even general action recognition in tasks that involve modeling the chronological sequence of actions, as discussed elsewhere herein.

In particular embodiments, a machine-learning model is trained to generate the above-discussed future action anticipation and/or long-term anticipation. The machine-learning model discussed herein is an end-to-end attention-based model, such as the AVT model, which attends to a sequence of image frames in a video to anticipate one or more future actions. The machine-learning model includes or consists of the spatial-attention encoder (e.g., transformer encoder 112) and the temporal-attention decoder (e.g., casual transformer decoder 152) components. In particular embodiments, the machine-learning model is trained based on three losses or loss functions, as discussed elsewhere herein. For instance, training the machine-learning model (e.g., the AVT model) for future action anticipation based on the three loss functions may include (1) determining a first loss function by comparing the future action anticipation with ground-truth future action, (2) determining a second loss function by comparing predicted future features, generated by the temporal-attention decoder, with ground-truth future features, (3) determining a third loss function by comparing predicted action class labels corresponding to the predicted future features with ground-truth action class labels, and (4) training the machine-learning model based on the first, second, and third loss functions.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for generating a future action anticipation, including the particular steps of the method of FIG. 7, this disclosure contemplates any suitable method for generating a future action anticipation, including any suitable steps, which may include a subset of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Example Display Systems

Figure 8:
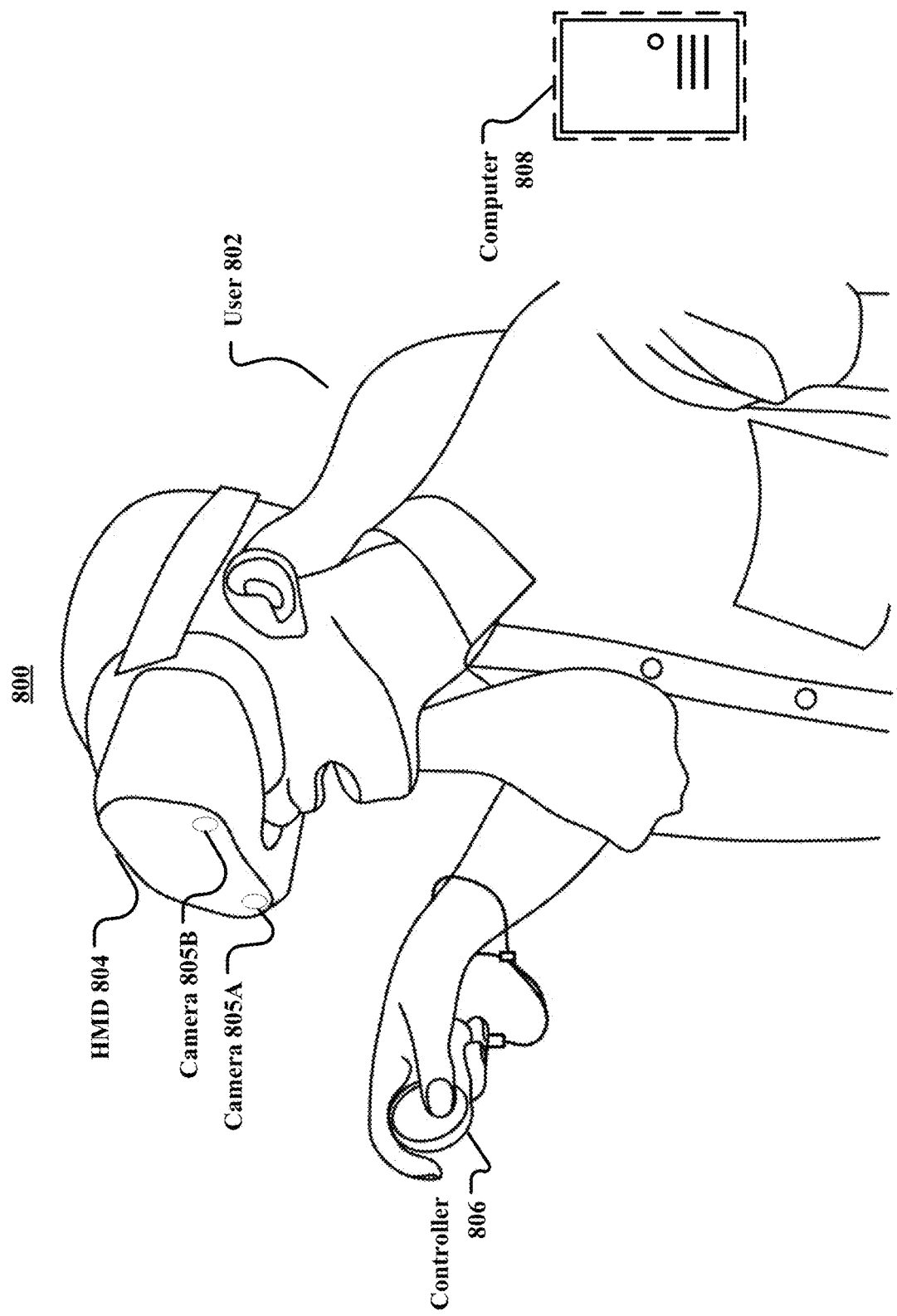
FIG. 8 illustrates an example display system, in accordance with particular embodiments.

FIG. 8 illustrates an example of a display system 800 worn by a user 802. The display system 800 may be used to implement some of the embodiments/examples disclosed herein. The display system 800 may be configured to operate as a virtual reality display, an augmented reality display, and/or a mixed reality display. In particular embodiments, the display system 800 may comprise a head-mounted device ("HMD") 804, a controller 806, and a computing unit or system 808. The HMD 804 may be worn over the user's eyes and provide visual content to the user 802 through internal displays (not shown). The HMD 804 may have two separate internal displays, one for each eye of the user 802. As illustrated in FIG. 8, the HMD 804 may completely cover the user's field of view. By being the exclusive provider of visual information to the user 802, the HMD 804 achieves the goal of providing an immersive artificial-reality experience.

The HMD 804 may have external-facing cameras, such as the two forward-facing cameras 805A and 805B shown in FIG. 8. While only two forward-facing cameras 805A-B are shown, the HMD 804 may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras are configured to capture the physical environment around the user and may do so continuously to generate a sequence of frames (e.g., as a video).

The 3D representation may be generated based on depth measurements of physical objects observed by the cameras 805A-B. Depth may be measured in a variety of ways. In particular embodiments, depth may be computed based on stereo images. For example, the two forward-facing cameras 805A-B may share an overlapping field of view and be configured to capture images simultaneously. As a result, the same physical object may be captured by both cameras 805A-B at the same time. For example, a particular feature of an object may appear at one pixel $p_A$ in the image captured by camera 805A, and the same feature may appear at another pixel $p_B$ in the image captured by camera 805B. As long as the depth measurement system knows that the two pixels correspond to the same feature, it could use triangulation techniques to compute the depth of the observed feature. For example, based on the camera 805A's position within a 3D space and the pixel location of $p_A$ relative to the camera 805A's field of view, a line could be projected from the camera 805A and through the pixel $p_A$. A similar line could be projected from the other camera 805B and through the pixel $p_B$. Since both pixels are supposed to correspond to the same physical feature, the two lines should intersect. The two intersecting lines and an imaginary line drawn between the two cameras 805A and 805B form a triangle, which could be used to compute the distance of the observed feature from either camera 805A or 805B or a point in space where the observed feature is located.

In particular embodiments, the pose (e.g., position and orientation) of the HMD 804 within the environment may be needed. For example, in order to render the appropriate display for the user 802 while he is moving about in a virtual environment, the system 800 would need to determine his position and orientation at any moment. Based on the pose of the HMD, the system 800 may further determine the viewpoint of either of the cameras 805A and 805B or either of the user's eyes. In particular embodiments, the HMD 804 may be equipped with inertial-measurement units ("IMU"). The data generated by the IMU, along with the stereo imagery captured by the external-facing cameras 805A-B, allow the system 800 to compute the pose of the HMD 804 using, for example, SLAM (simultaneous localization and mapping) or other suitable techniques.

In particular embodiments, the display system 800 may further have one or more controllers 806 that enable the user 802 to provide inputs. The controller 806 may communicate with the HMD 804 or a separate computing unit 808 via a wireless or wired connection. The controller 806 may have any number of buttons or other mechanical input mechanisms. In addition, the controller 806 may have an IMU so that the position of the controller 806 may be tracked. The controller 806 may further be tracked based on predetermined patterns on the controller. For example, the controller 806 may have several infrared LEDs or other known observable features that collectively form a predetermined pattern. Using a sensor or camera, the system 800 may be able to capture an image of the predetermined pattern on the controller. Based on the observed orientation of those patterns, the system may compute the controller's position and orientation relative to the sensor or camera.

The display system 800 may further include a computing unit 808. The computing unit may be a stand-alone unit that is physically separate from the HMD 804 or it may be integrated with the HMD 804. In embodiments where the computing unit 808 is a separate unit, it may be communicatively coupled to the HMD 804 via a wireless or wired link. The computing unit 808 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by a display system 800 depends on the capabilities of its computing unit 808.

Figure 9:
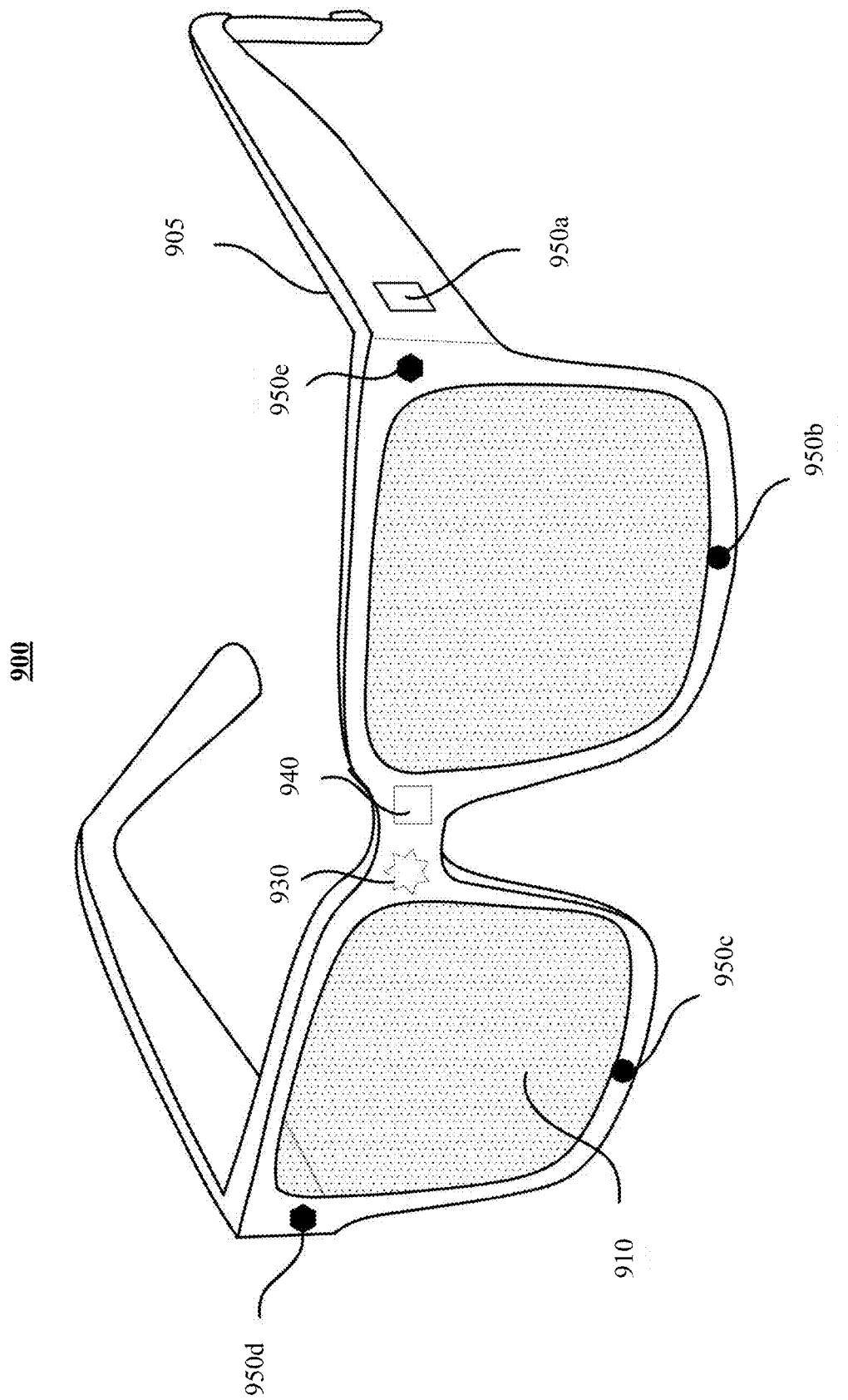
FIG. 9 illustrates another example display system, in accordance with particular embodiments.

FIG. 9 illustrates another example display system 900 that can be worn by a user. Specifically, FIG. 9 is a perspective view of an example of a near-eye display system 900 in the form of a pair of glasses for implementing some of the embodiments/examples disclosed herein. Near-eye display system 900 may be a specific implementation of the display system 800 of FIG. 8, and may be configured to operate as a virtual reality display, an augmented reality display, and/or a mixed reality display. Near-eye display system 900 may include a frame 905 and a display 910. Display 910 may be configured to present content (e.g., video and future action anticipations) to a user. In some embodiments, display 910 may include display electronics and/or display optics. For example, display 910 may include an LCD display panel, an LED display panel, or an optical display panel (e.g., a waveguide display assembly).

Near-eye display system 900 may further include various sensors 950a, 950b, 950c, 950d, and 950e on or within frame 905. In some embodiments, sensors 950a-950e may include one or more depth sensors, motion sensors, position sensors, inertial sensors, or ambient light sensors. In some embodiments, sensors 950a-950e may include one or more image sensors configured to generate image data representing different fields of views in different directions. In some embodiments, sensors 950a-950e may be used as input devices to control or influence the displayed content of near-eye display system 900, and/or to provide an interactive VR/AR/MR experience to a user of near-eye display system 900. In some embodiments, sensors 950a-950e may also be used for stereoscopic imaging.

In some embodiments, near-eye display system 900 may further include one or more illuminators 930 to project light into the physical environment. The projected light may be associated with different frequency bands (e.g., visible light, infra-red light, ultra-violet light, etc.), and may serve various purposes. For example, illuminator(s) 930 may project light in a dark environment (or in an environment with low intensity of infra-red light, ultra-violet light, etc.) to assist sensors 950a-950e in capturing images of different objects within the dark environment. In some embodiments, illuminator(s) 930 may be used to project certain light patterns onto the objects within the environment.

In some embodiments, near-eye display system 900 may also include a high-resolution camera 940. Camera 940 may capture images of the physical environment in the field of view. The captured images may be processed, for example, by a virtual reality engine to add virtual objects to the captured images or modify physical objects in the captured images, and the processed images may be displayed to the user by display 910 for AR or MR applications.

Example Network Environment

Figure 10:
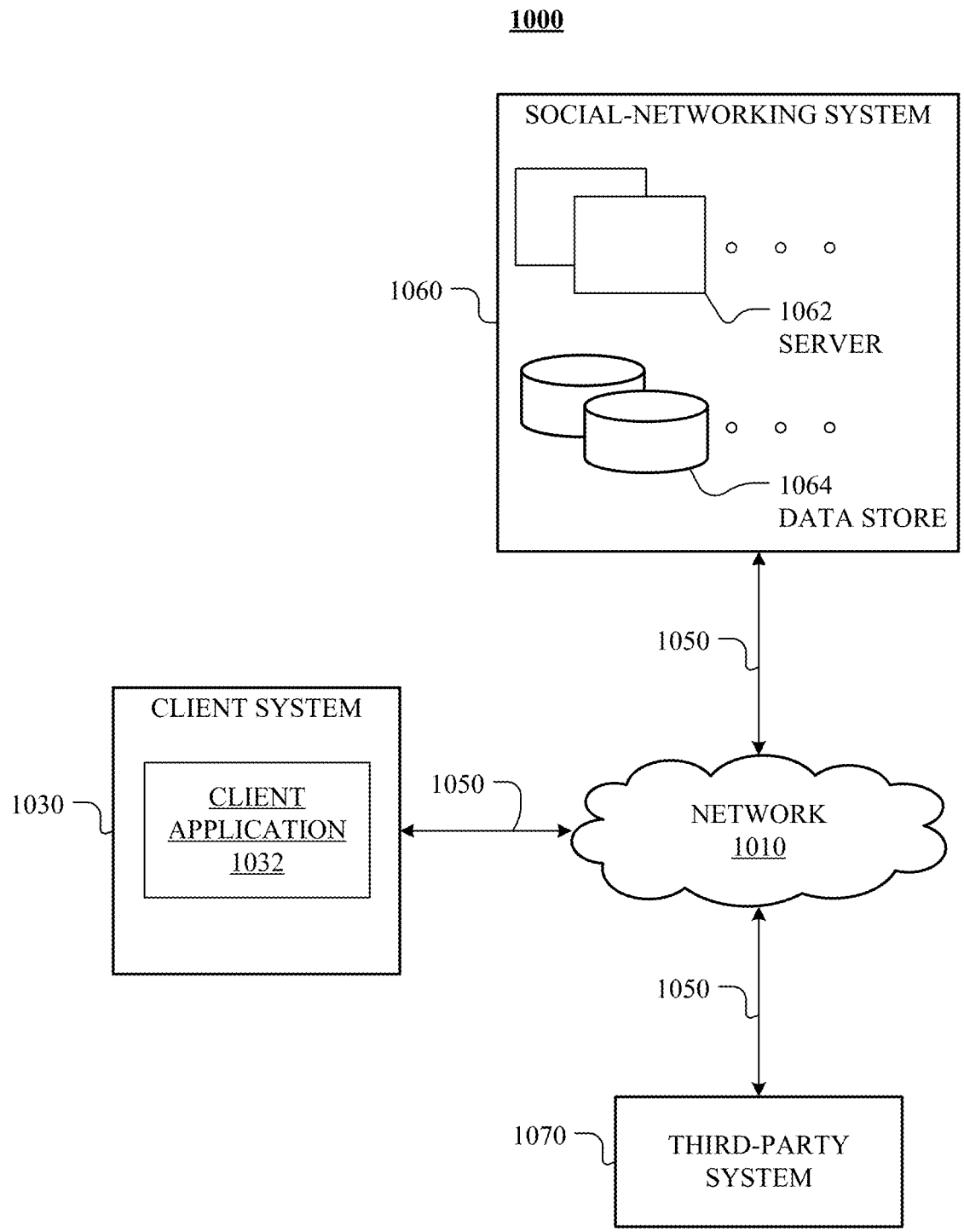
FIG. 10 illustrates an example network environment associated with a social-networking system.

FIG. 10 illustrates an example network environment 1000 associated with a social-networking system. Network environment 1000 includes a client system 1030, a social-networking system 1060, and a third-party system 1070 connected to each other by a network 1010. Although FIG. 10 illustrates a particular arrangement of client system 1030, social-networking system 1060, third-party system 1070, and network 1010, this disclosure contemplates any suitable arrangement of client system 1030, social-networking system 1060, third-party system 1070, and network 1010. As an example and not by way of limitation, two or more of client system 1030, social-networking system 1060, and third-party system 1070 may be connected to each other directly, bypassing network 1010. As another example, two or more of client system 1030, social-networking system 1060, and third-party system 1070 may be physically or logically co-located with each other in whole or in part. Moreover, although FIG. 10 illustrates a particular number of client systems 1030, social-networking systems 1060, third-party systems 1070, and networks 1010, this disclosure contemplates any suitable number of client systems 1030, social-networking systems 1060, third-party systems 1070, and networks 1010. As an example and not by way of limitation, network environment 1000 may include multiple client systems 1030, social-networking systems 1060, third-party systems 1070, and networks 1010.

This disclosure contemplates any suitable network 1010. As an example and not by way of limitation, one or more portions of network 1010 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1010 may include one or more networks 1010.

Links 1050 may connect client system 1030, social-networking system 1060, and third-party system 1070 to communication network 1010 or to each other. This disclosure contemplates any suitable links 1050. In particular embodiments, one or more links 1050 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1050 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1050, or a combination of two or more such links 1050. Links 1050 need not necessarily be the same throughout network environment 1000. One or more first links 1050 may differ in one or more respects from one or more second links 1050.

In particular embodiments, client system 1030 may be an electronic device including hardware, software, or embedded logic components or a combination of two or more such components and capable of carrying out the appropriate functionalities implemented or supported by client system 1030. As an example and not by way of limitation, a client system 1030 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 1030. A client system 1030 may enable a network user at client system 1030 to access network 1010. A client system 1030 may enable its user to communicate with other users at other client systems 1030.

In particular embodiments, client system 1030 may include a client application 1032 operable to provide various computing functionalities, services, and/or resources, and to send data to and receive data from the other entities of the network 1010, such as the social-networking system 1060 and/or the third-party system 1070. For example, the client application 1032 may be a social-networking application, an artificial-intelligence related application, a virtual reality application, an augmented reality application, an artificial reality or a mixed reality application, a camera application, a messaging application for messaging with users of a messaging network/system, a gaming application, an internet searching application, etc.

In particular embodiments, the client application 1032 may be storable in a memory and executable by a processor of the client system 1030 to render user interfaces, receive user input, send data to and receive data from one or more of the social-networking system 1060 and the third-party system 1070. The client application 1032 may generate and present user interfaces to a user via a display of the client system 1030.

In particular embodiments, social-networking system 1060 may be a network-addressable computing system that can host an online social network, a virtual reality environment, or an augmented reality environment. Social-networking system 1060 may generate, store, receive, and send social-networking data, such as, for example, user-profile data, concept-profile data, social-graph information, or other suitable data related to the online social network. Social-networking system 1060 may be accessed by the other components of network environment 1000 either directly or via network 1010. As an example and not by way of limitation, client system 1030 may access social-networking system 1060 using a web browser, or a native application associated with social-networking system 1060 (e.g., a mobile social-networking application, a messaging application, another suitable application, or any combination thereof) either directly or via network 1010. In particular embodiments, social-networking system 1060 may include one or more servers 1062. Each server 1062 may be a unitary server or a distributed server spanning multiple computers or multiple datacenters. Servers 1062 may be of various types, such as, for example and without limitation, a mapping server, web server, news server, mail server, message server, advertising server, file server, application server, exchange server, database server, proxy server, another server suitable for performing functions or processes described herein, or any combination thereof. In particular embodiments, each server 1062 may include hardware, software, or embedded logic components or a combination of two or more such components for carrying out the appropriate functionalities implemented or supported by server 1062. In particular embodiments, social-networking system 1060 may include one or more data stores 1064. Data stores 1064 may be used to store various types of information. In particular embodiments, the information stored in data stores 1064 may be organized according to specific data structures. In particular embodiments, each data store 1064 may be a relational, columnar, correlation, or other suitable database. Although this disclosure describes or illustrates particular types of databases, this disclosure contemplates any suitable types of databases. Particular embodiments may provide interfaces that enable a client system 1030, a social-networking system 1060, or a third-party system 1070 to manage, retrieve, modify, add, or delete, the information stored in data store 1064.

In particular embodiments, social-networking system 1060 may store one or more social graphs in one or more data stores 1064. In particular embodiments, a social graph may include multiple nodes—which may include multiple user nodes (each corresponding to a particular user) or multiple concept nodes (each corresponding to a particular concept)—and multiple edges connecting the nodes. Social-networking system 1060 may provide users of the online social network the ability to communicate and interact with other users. In particular embodiments, users may join the online social network via social-networking system 1060 and then add connections (e.g., relationships) to a number of other users of social-networking system 1060 to whom they want to be connected. Herein, the term "friend" may refer to any other user of social-networking system 1060 with whom a user has formed a connection, association, or relationship via social-networking system 1060.

In particular embodiments, social-networking system 1060 may provide users with the ability to take actions on various types of items or objects, supported by social-networking system 1060. As an example and not by way of limitation, the items and objects may include groups or social networks to which users of social-networking system 1060 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 1060 or by an external system of third-party system 1070, which is separate from social-networking system 1060 and coupled to social-networking system 1060 via a network 1010.

In particular embodiments, social-networking system 1060 may be capable of linking a variety of entities. As an example and not by way of limitation, social-networking system 1060 may enable users to interact with each other as well as receive content from third-party systems 1070 or other entities, or to allow users to interact with these entities through an application programming interfaces (API) or other communication channels.

In particular embodiments, a third-party system 1070 may include one or more types of servers, one or more data stores, one or more interfaces, including but not limited to APIs, one or more web services, one or more content sources, one or more networks, or any other suitable components, e.g., that servers may communicate with. A third-party system 1070 may be operated by a different entity from an entity operating social-networking system 1060. In particular embodiments, however, social-networking system 1060 and third-party systems 1070 may operate in conjunction with each other to provide social-networking services to users of social-networking system 1060 or third-party systems 1070. In this sense, social-networking system 1060 may provide a platform, or backbone, which other systems, such as third-party systems 1070, may use to provide social-networking services and functionality to users across the Internet.

In particular embodiments, a third-party system 1070 may include a third-party content object provider. A third-party content object provider may include one or more sources of content objects, which may be communicated to a client system 1030. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 1060 also includes user-generated content objects, which may enhance a user's interactions with social-networking system 1060. User-generated content may include anything a user can add, upload, send, or "post" to social-networking system 1060. As an example and not by way of limitation, a user communicates posts to social-networking system 1060 from a client system 1030. Posts may include data such as status updates or other textual data, location information, photos, videos, links, music or other similar data or media. Content may also be added to social-networking system 1060 by a third-party through a "communication channel," such as a newsfeed or stream.

In particular embodiments, social-networking system 1060 may include a variety of servers, sub-systems, programs, modules, logs, and data stores. In particular embodiments, social-networking system 1060 may include one or more of the following: a web server, a mapping server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 1060 may also include suitable components such as network interfaces, security mechanisms, load balancers, failover servers, management-and-network-operations consoles, other suitable components, or any suitable combination thereof. In particular embodiments, social-networking system 1060 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 1060 to one or more client systems 1030 or one or more third-party system 1070 via network 1010. The web server may include a mail server or other messaging functionality for receiving and routing messages between social-networking system 1060 and one or more client systems 1030. An API-request server may allow a third-party system 1070 to access information from social-networking system 1060 by calling one or more APIs. An action logger may be used to receive communications from a web server about a user's actions on or off social-networking system 1060. In conjunction with the action log, a third-party-content-object log may be maintained of user exposures to third-party-content objects. A notification controller may provide information regarding content objects to a client system 1030. Information may be pushed to a client system 1030 as notifications, or information may be pulled from client system 1030 responsive to a request received from client system 1030. Authorization servers may be used to enforce one or more privacy settings of the users of social-networking system 1060. A privacy setting of a user determines how particular information associated with a user can be shared. The authorization server may allow users to opt in to or opt out of having their actions logged by social-networking system 1060 or shared with other systems (e.g., third-party system 1070), such as, for example, by setting appropriate privacy settings. Third-party-content-object stores may be used to store content objects received from third parties, such as a third-party system 1070. Location stores may be used for storing location information received from client systems 1030 associated with users. Advertisement-pricing modules may combine social information, the current time, location information, or other suitable information to provide relevant advertisements, in the form of notifications, to a user.

Example Computer System

Figure 11:
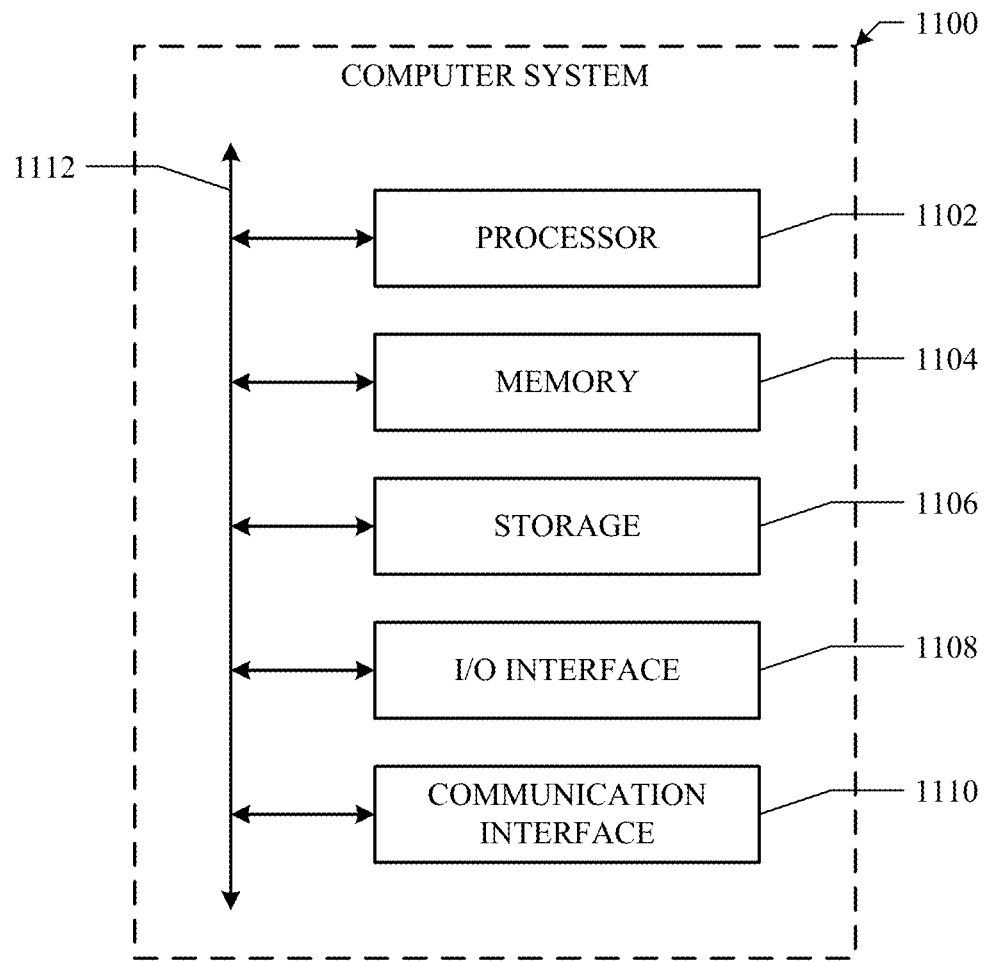
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, implemented by a computing system, comprising:
   receiving a video comprising a plurality of image frames;
   generating, for the plurality of image frames and using a spatial-attention encoder, one or more image-frame features corresponding to one or more image frames of the plurality of image frames;

for the one or more image-frame features, generating, using a temporal-attention decoder, a predicted future feature based on the one or more image-frame features corresponding to the one or more image frames that precede a time associated with the predicted future feature; and generating a video representation of a future action anticipation based on the predicted future feature, wherein the future action anticipation corresponds to an anticipation of a future action occurring after a sequence of actions observed in the plurality of image frames in the video, and wherein the video representation is configured for display on a user interface.

2. The method of claim 1, further comprising:
generating a predicted action class label for the predicted future feature using a linear classifier.

3. The method of claim 2, further comprising:
determining a first loss function by comparing the future action anticipation with ground-truth future action;
determining a second loss function by comparing predicted future features, generated by the temporal-attention decoder, with ground-truth future features;
determining a third loss function by comparing predicted action class labels corresponding to the predicted future features with ground-truth action class labels; and
training a machine-learning model based on the first loss fuction, the second loss fuction, and the third loss function, wherein the machine-learning model is used to generate the future action anticipation.

4. The method of claim 3, wherein the machine-learning model comprises the spatial-attention encoder and the temporal-attention decoder.

5. The method of claim 3, wherein the machine-learning model is an end-to-end attention-based model that attends to the plurality of image frames in the video to anticipate one or more future actions.

6. The method of claim 1, further comprising:
generating a long-term anticipation comprising a sequence of future actions occurring after the sequence of actions observed in the plurality of images frames in the video.

7. The method of claim 1, further comprising:
displaying the video representation of the future action anticipation on the user interface of a device worn by a user.

8. The method of claim 7, wherein the device worn by the user is an augmented-reality device.

9. The method of claim 7, wherein the video is an egocentric video captured using one or more cameras of the device worn by the user.

10. The method of claim 1, wherein generating the future action anticipation comprises:
decoding the predicted future feature of the video into a distribution over semantic action classes using a linear classifier.

11. The method of claim 1, wherein generating, using the spatial-attention encoder, the one or more image-frame features corresponding to the one or more image frames comprises:
splitting the one or more image frames into a plurality of patches;
determining, for the plurality of patches, patch features corresponding to the plurality of patches;
adding, to the patch features, a classification token and a spatial position embedding; and
generating a feature corresponding to the one or more image frames based on the patch features and the spatial position embeddings.

12. The method of claim 1, wherein the spatial-attention encoder is a transformer encoder comprising one or more of a multi-head self-attention component and a feed forward network.

13. The method of claim 1, wherein the generating, using the temporal-attention decoder, the predicted future feature comprises:
adding a temporal position encoding to the image-frame features generated using the spatial-attention encoder; and
generating the predicted future feature at a current frame image in the video after attending to an image-frame feature corresponding to the current image frame and one or more image-frame features corresponding to one or more image frames preceding the current image frame in the video.

14. The method of claim 13, wherein the temporal-attention decoder is a transformer decoder with casual masked attention.

15. The method of claim 14, wherein the casual masked attention ensures that the temporal-attention decoder attends to specific portions or image frames of the video for the future action anticipation.

16. The method of claim 1, wherein the sequence of actions observed in the plurality of image frames in the video is associated with one or more action tasks.

17. The method of claim 16, wherein the future action anticipation comprises a subsequent action task that is likely to be performed or followed after the one or more action tasks associated with the sequence of actions observed in the plurality of image frames in the video.

18. The method of claim 1, wherein the plurality of image frames is sequential.

19. One or more computer-readable non-transitory storage media embodying software that is operable when executed to:
receive a video comprising a plurality of image frames;
generate, for the plurality of image frames and using a spatial-attention encoder, one or more image-frame features corresponding to the one or more image frames of the plurality of image frames;
for the one or more image-frame features, generate, using a temporal-attention decoder, a predicted future feature based on the one or more image-frame features corresponding to the one or more image frames that precede a time associated with the predicted future feature; and
generate a video representation of a future action anticipation based on the predicted future feature, wherein the future action anticipation corresponds to an anticipation of a future action occurring after a sequence of actions observed in the plurality of image frames in the video, and wherein the video representation is configured for display on a user interface.

20. A system comprising:
one or more processors; and
one or more computer-readable non-transitory storage media coupled to one or more of the processors and comprising instructions operable when executed by one or more of the processors to cause the system to:
receive a video comprising a plurality of image frames;
generate, for the plurality of image frames and using a spatial-attention encoder, an one or more image-frame features corresponding to one or more image frames of the plurality of image frames;

for the one or more image-frame features, generate, using a temporal-attention decoder, a predicted future feature based on the one or more image-frame features corresponding to the one or more image frames that precede a time associated with the predicted future feature; and generate a video representation of a future action anticipation based on the predicted future feature, wherein the future action anticipation corresponds to an anticipation of a future action occurring after a sequence of actions observed in the plurality of image frames in the video, and wherein the video representation is configured for display on a user interface.

* * * * *